United States Patent [19]
Kulakowski et al.

[11] Patent Number: 5,233,584
[45] Date of Patent: Aug. 3, 1993

[54] OPTICAL DISK DEVICE USING HIGH AND LOW DATA-SENSING CRITERIA PLUS DEVICE RECALIBRATION FOR ERROR CONTROL

[75] Inventors: John E. Kulakowski; Judson A. McDowell; Rodney J. Means, all of Tucson, Ariz.

[73] Assignee: International Business Machines Corporation, Armonk, N.Y.

[21] Appl. No.: 577,250

[22] Filed: Sep. 4, 1990

[51] Int. Cl.⁵ .............................................. G11B 7/095
[52] U.S. Cl. .............................. 369/44.27; 369/44.29; 369/44.31; 369/44.33; 369/48; 369/50; 369/54; 369/58
[58] Field of Search ............... 369/32, 44.25–44.27, 369/44.29, 44.31–44.36, 44.39, 47, 48, 50, 54, 58

[56] References Cited

U.S. PATENT DOCUMENTS

| | | | |
|---|---|---|---|
| 4,571,714 | 2/1986 | Mathews et al. | 369/44.31 |
| 4,571,716 | 2/1986 | Szerlip | 369/54 |
| 4,800,548 | 1/1989 | Koishi et al. | 369/54 |
| 4,891,716 | 1/1990 | Andersen | 360/31 |
| 4,998,233 | 3/1991 | DiMatteo et al. | 369/44.27 X |
| 5,003,521 | 3/1991 | Yoshida et al. | 369/44.27 X |
| 5,134,606 | 7/1992 | Sekiguchi et al. | 369/54 X |
| 5,136,569 | 8/1992 | Fennema et al. | 369/44.27 X |

FOREIGN PATENT DOCUMENTS 0248206 12/1987 European Pat. Off. .
8906428 7/1989 PCT Int'l Appl. .
223811 1/1991 United Kingdom .

Primary Examiner—W. R. Young
Attorney, Agent, or Firm—Herbert Somermeyer

[57] ABSTRACT

Error control procedures are described for an optical disk recorder. High and low criteria for each of a plurality of machine operations or functions of an optical disk recorder are described. Such functions include erasing a sector, writing data, and reading data. Each function has two sub parts, reading a sector ID and performing the function in a data field. The high and low criteria for reading the sector ID and for performing the function in the data field, are different. The high and low criteria for a ROM portion of the optical disk are different from that provided for magnetooptic portion.

42 Claims, 10 Drawing Sheets

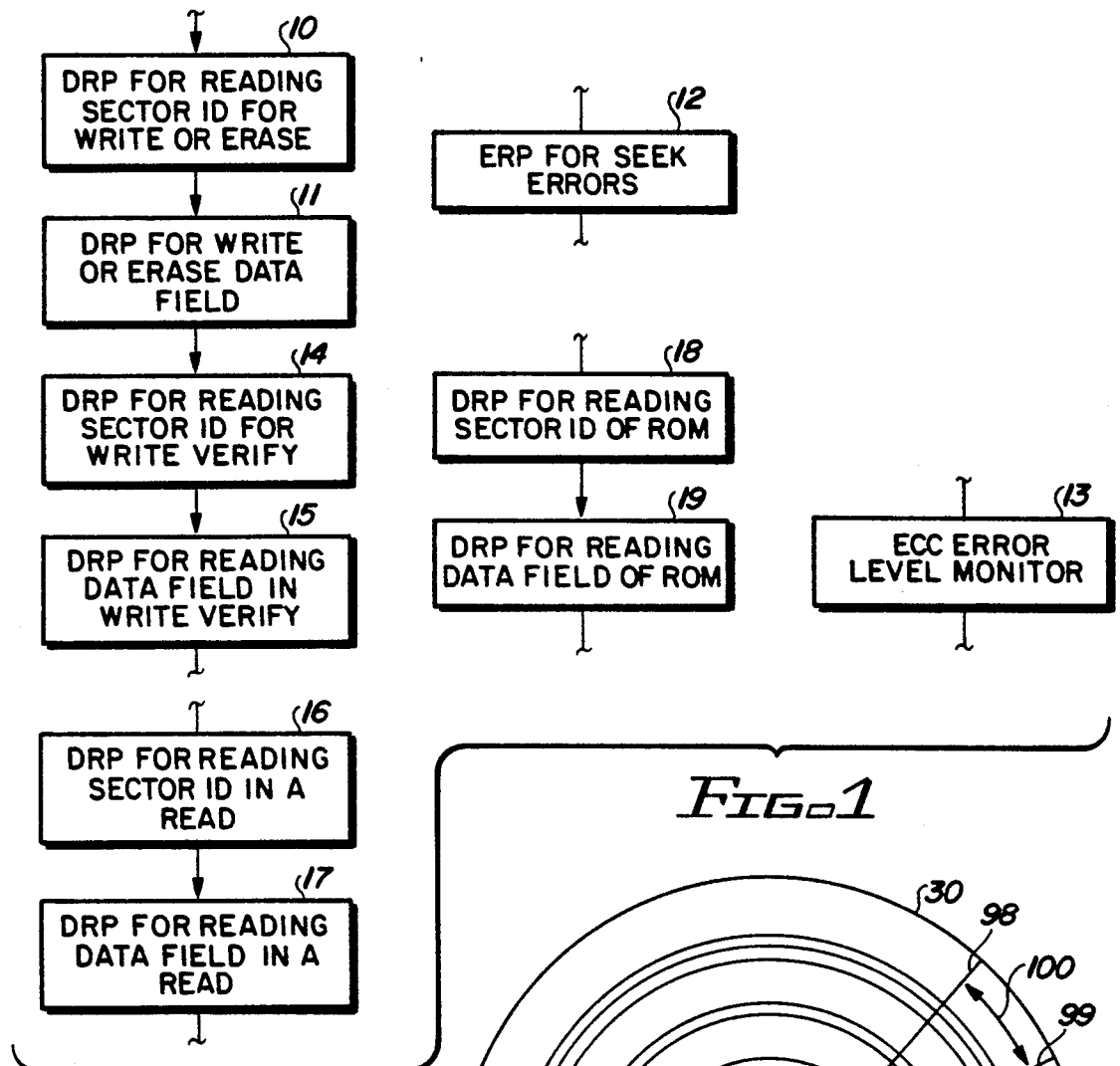
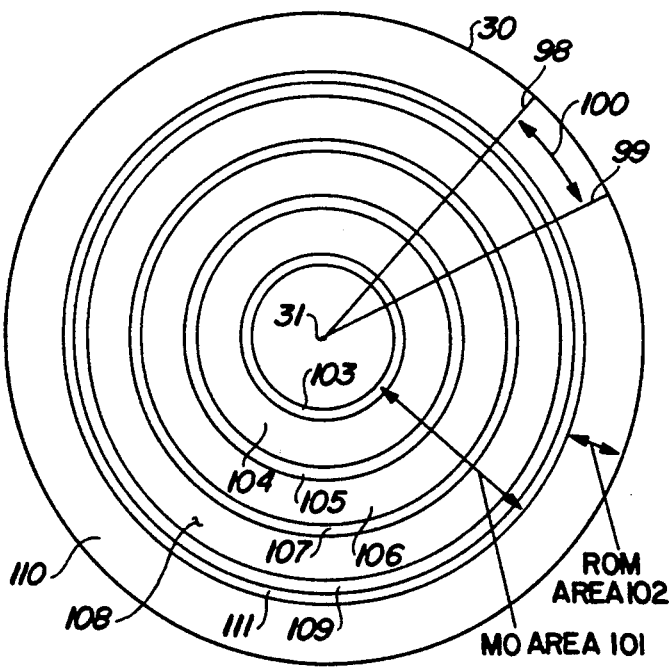
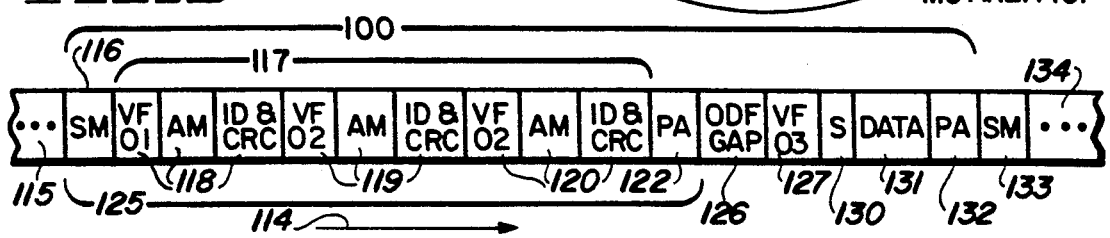

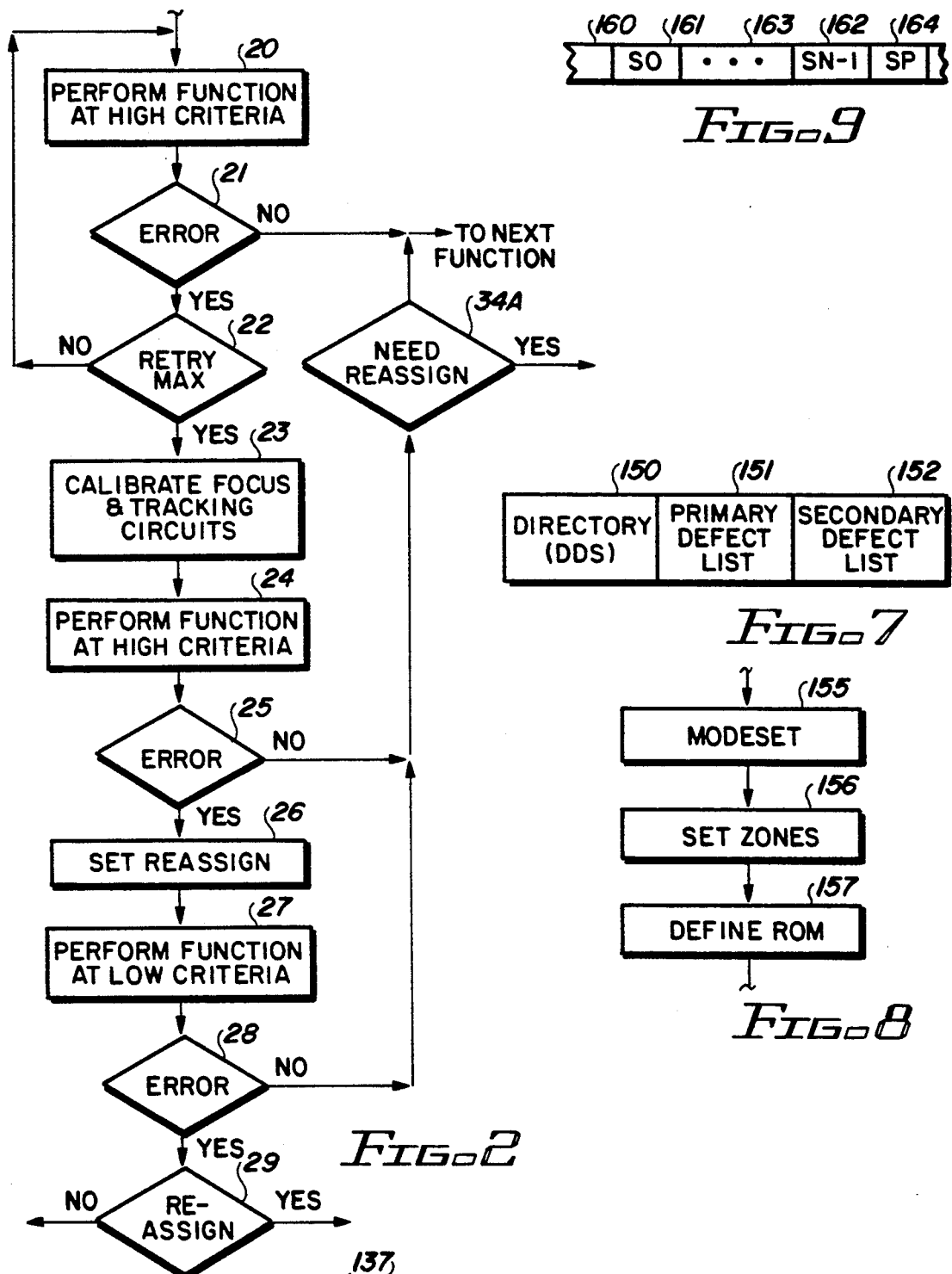

OPTICAL DISK DEVICE USING HIGH AND LOW DATA-SENSING CRITERIA PLUS DEVICE RECALIBRATION FOR ERROR CONTROL

FIELD OF THE INVENTION

The present invention relates to optical signal or data recorders and more particularly to error control systems for such optical recorders which provide data and system integrity and checks thereon.

BACKGROUND OF THE INVENTION

Optical disk recorders and players exhibit error prone peculiarities requiring error recovery procedures that have not been necessary for other data recorders such as magnetic disk recorders. The peculiarity of many optical disk recorders include multiple embossed sector identification signals for each sector, higher data error rates because of small areas of the optical disk used to record bits of such data, error growth caused by aging of the optical media as currently used, high track densities yielding a negative impact on seek reliability and implications of automatic reallocation of data assigned to one sector to another sector. The latter item is described in the AMERICAN NATIONAL STANDARD INSTITUTE (ANSI) proposed standard X3.131-198X SCSI-II, revision 10B dated Aug. 22, 1989, particularly in pages 8-27 through 8-29 and pages 15-1 through 15-30. The proposed standard is published in August of 1989 by committee X3B11. What is needed are procedures and mechanisms for handling temporary, recoverable and unrecoverable errors in the sector identifications (ID's) and in the data recording areas. It is also desired to isolate optical media caused errors from hardware errors. Recorders can automatically recover from some errors. Such errors are called soft errors. Magneto-optic recorders require a redefinition for these soft errors. A mechanism is desired for handling the automatic reassignment of data assigned defective sectors which store data or are intended to store data which complies with the new SCSI-II reallocation definition, as set forth in the above-mentioned proposed ANSI standard.

DISCUSSION OF PRIOR ART

U.S. Pat. No. 3,078,448 by Hugh O'Brien provides apparatus for checking information stored on the multitrack magnetic tape medium. Checking comprises means to read information stored on a magnetic tape to produce a readback signal. Means responsive to the readout means simultaneously produce first and second versions of the readback signal, respectively, in first and second information channels. The output signals i.e., two versions of the readback signal are sent to a comparison means which detect a difference between the two versions such that one of the two versions can be selected. In the first information channel, the version is produced with a high amplitude signal clipping level to detect the readback signal from the magnetic tape while the second information channel processes signals read with a lower amplitude signal clipping level. High and low clipping levels can be compared to high and low readback criteria. A high clipping level acts as a noise rejection feature while the low readback criteria enables recovery of signals of relatively low amplitude.

Ernest Devore et al, U.S. Pat. No. 3,774,154 teaches the use of high-powered error detection and correction codes in a magnetic tape recorder. When signals are to be recorded on a magnetic tape, a read after write procedure is used. In that read after write procedure, if a high power error correction and detection code (ECC) can provide correct data while correcting a minimal number of errors, then the signals are left on the tape. If, however, the number of errors during the read after write operation exceed a predetermined threshold, then the data is erased from the tape and rewritten at a different area on the tape. A signal-derived error location pointing signals (also termed dead tracking signals) are used with the ECC to correct errors. Such error pointing signals must be present for retaining the signals in error just recorded on the magnetic tape.

Mathews et al. in U.S. Pat. No. 4,571,714 show calibration tracks separate from data tracks on an optical disk recorder. Such calibration tracks are used for calibrating focus and tracking circuits of the optical disk recorder.

Ogata et al. in U.S. Pat. No. 4,638,472 show detecting errors in an optical disk sector. This operation is performed during a read after write operation. If an error is detected in the just written optical disk sector, then the information still in the host processor is rewritten onto an alternative area of the recording medium using the buffer memory. This operation requires that the host processor retain a valid copy of the data such that it can be rewritten to another area. It should be noted that the signals recorded on the optical disk and read therefrom are not recorded in the reassignment area; rather, it is the data stored and supplied by the host processor that is recorded in the alternative area.

Abiko in U.S. Pat. No. 4,835,757 teaches alternate areas for data having addresses pointing to a bad or defective sector. This patent appears to be cumulative to the Ogata et al. patent, supra.

SUMMARY OF THE INVENTION

It is an object of the invention to provide a comprehensive error detection and recovery control system for an optical disk recording system. In one aspect of the present invention, high and low criteria are established for diverse disk recorder operations relating to exchanging signals with an optical medium, including either recording signals or data on the medium and reading signals from the medium. Such high and low criteria are different for different operations, such as being different for recording and reading in a magnetooptic area of a disk as opposed to reading in an embossed or read only memory (ROM) portion of the medium.

In accordance with another aspect of the invention, when the signals can be successfully read from the medium only using low criteria, then the signals read from the medium are rerecorded at a different portion of the optical disk medium. The rerecording or reassignment of the data applies equally to the magnetooptic (MO) or pre-recorded, such as ROM, portions of the medium.

Another aspect of the invention is signal exchanging function is first performed using high criteria. If an error is detected, a retry at the high criteria can be effected. On a failure of reading at high criteria, the focus and tracking circuits of the optical disk recorder are calibrated. Following the calibration, the medium related function is again retried. If the medium related function is successful, reassignment of the data to another portion of the medium may be deferred. If an error occurs in a performance of the medium related function after the focus and tracking calibration, a reassignment flag is set, then the function is again performed (read, write or erase for example) using low criteria. Even though the low criteria operation is successful, the signals obtained from the medium are recorded on the medium at a different location for ensuring successful read back. Other procedures and criteria within the scope of the present invention will become apparent from a reading of the following specification and claims.

The foregoing and other objects, features and advantages of the invention will be apparent from the following more particular description of preferred embodiments of the invention, as illustrated in the accompanying drawings.

DESCRIPTION OF THE DRAWINGS

FIG. 1 is a block diagram showing various data error recovery procedures (DRP) and other error control functions performed in an optical disk recorder in accordance with the present invention.

FIG. 2 is a machine operations flow chart which shows in general the DRP functions shown in FIG. 1.

FIG. 4 is a diagrammatic plan view of an optical disk recording medium usable with the FIG. 3 illustrated optical disk recorder which can be advantageously used in accordance with the present invention.

FIG. 5 shows a sector format of the FIG. 4 illustrated optical disk recording medium.

FIG. 6 diagrammatically shows an error correction data matrix usable with the FIG. 5 illustrated sector.

FIG. 7 shows media defect controls recordable on the FIG. 4 illustrated optical disk medium.

FIG. 8 is a simplified machine flow chart showing a host-initiated set up of recorder operations for effecting operations in accordance with the invention using the FIG. 4 illustrated disk.

FIG. 9 is a simplified showing of a ROM sector with which the present invention is advantageously employed.

DETAILED DESCRIPTION OF THE DRAWINGS

Referring now more particularly to the appended drawing, like numerals indicate like parts and functions in the various figures. First, the arrangement of the invention for data error recover procedures (DRP), error recovery procedure (ERP) for non-data operations and error level monitor (ECC) for setting high and low criteria for acceptance of recording and readback operations is described. The high and low acceptance criteria for the various operations are diverse. For a clear grasp of the effect of high and low criteria on the various optical disk operations, these criteria are summarized in the table below and arranged with respect to illustrative optical disk recorder functions.

TABLE I

Figure 18:
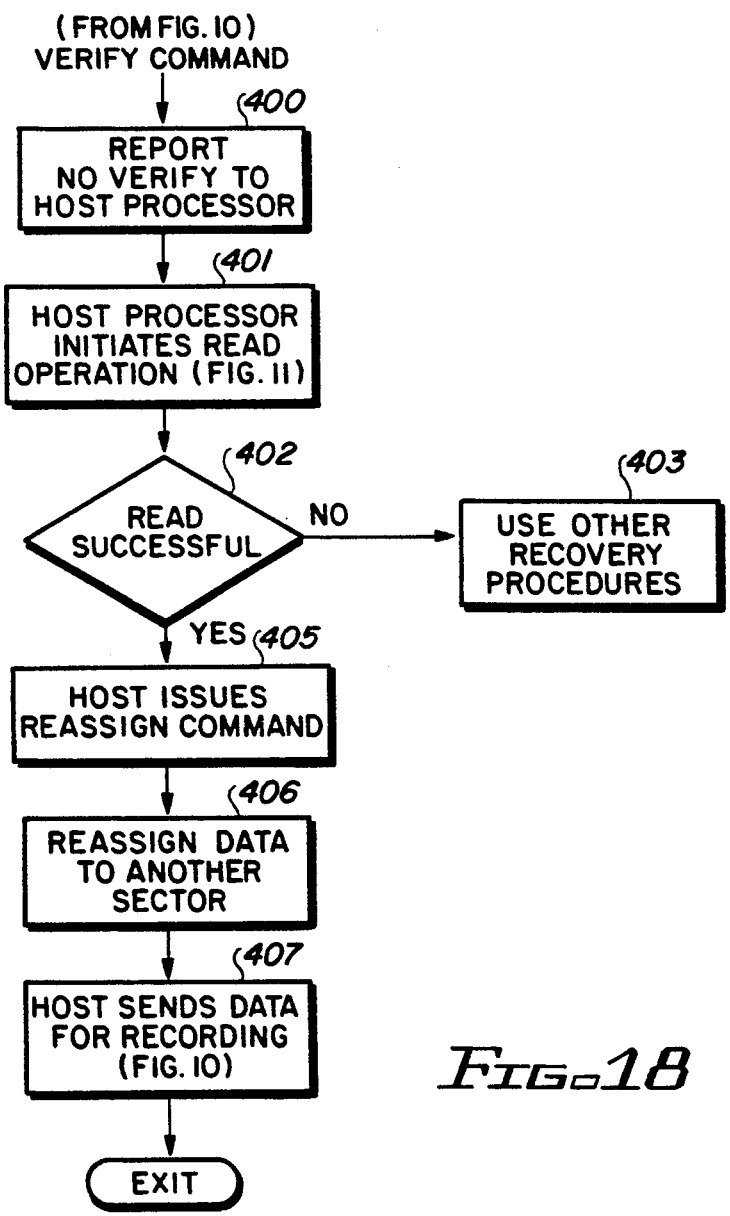
FIG. 18 is a simplified flow chart of machine operations for data recovery related to recording verification.

| FUNCTION | HIGH AND LOW CRITERIA FOR EACH DISK SECTOR | |
|---|---|---|
| | HIGH CRITERIA | LOW CRITERIA |
| Erase (Read ID Field) | Two ID's valid | Two ID's valid |
| Write and Write Verify (Read ID Field) | Two ID's valid | Two ID's valid |
| Write Verify (Read data Field) | No more than three bytes in error per code word, data sync valid, all resync bytes are valid and stressed detection | No low (Read criteria data is reassigned to another sector and sent to one device from host |
| Read (Read ID field) | Two ID's valid | One ID valid |
| Read (Read Data field) | No more than three bytes in error per code word, data sync is valid, and all resync bytes are valid | Recover data in any manner |
| Verify (Read Data Field) | No more than three bytes in error per code word, data sync is valid resync's are valid and use stressed detection | No low (Read criteria report error to host processor for FIG. 18 recovery |
| Verify (Read ID field) | Two ID's valid | Two ID's valid |
| Read ROM (Read ID field) | Two ID's valid | Recover data in any manner |
| Read ROM (Read Data field) | Five bytes in error per code word, two data syncs are valid and three resync bytes are in error | Recover data in any manner |

The table above refers to high and low criteria for operations conducted in each of the independently addressable disk sectors. In the function column the top words refer to the machine operation, such as erasing a sector, writing to a sector, verifying the written sector, reading a sector, and reading a ROM sector. The function in the parenthesis underneath the broad machine functions indicate which portion of a sector is being accessed to which the high and low criteria apply. That is, each disk sector has an identification (ID) field and a data field. Before any operation can occur on the data field, the ID field is read to ensure a correct track and a correct sector within that track is being properly addressed. Each ID field in each sector has three copies of the sector ID (track number and circumferential or sector number). In the above table, during a write or erase function, the device must be able to read (Valid) two of the three sector ID's. On writing data to a sector, two of the three sector ID's must be valid i.e. readable for both the high and low criteria. For verifying the written data on a write verify, to "successfully" read the ID field, two of the three ID's must be valid before data can be written to the sector. That is, before data can be retained in the sector for later reading, two of the three ID's must be valid upon a read-after-write (write verify) operation. However, for reading the data field during a write verify operation and an independent verify operation, the high criteria is based in part upon the power of the error detection and correction code (ECC) used in each particular embodiment. For example, at the high acceptance criteria, in the data field, three bytes can be in error per code word (later described). All the data sync portions must be valid (there are three data syncs in each sector) for the data field. The resync fields within the data field, as later described, must all be valid and the readback must be successful under a stressed detection procedure. If not, the data is reassigned to another sector on the medium. A stressed detection procedure merely means a signal readback and detection which is not optimum for reliable signal recovery, the stressing is such that signal recovery is error prone, several known techniques can be used, including merely increasing the signal deletion threshold.

Reading operations are somewhat different from writing operations. Of course, reading operations can occur at variable periods of time after the write followed by the verify operations, described above. Upon reading the ID field during a read operation, the high criteria is two ID's valid but the low criteria is one ID valid. If none of the ID's can be read, then a special error recovery procedure is followed in which the device times the scanning of the track from an upstream sector to reach the data field whereupon the data field is attempted to be read. If the data field can be read, then, under host processor 37 control, the data is reassigned to another sector for recording therein. Upon reading the data field during a read operation, note that the high and low criteria are quite different. In reading a ROM sector ID field, the acceptance criteria are the same as for reading a ID field in the MO area of the disk. In the data field of the ROM, the criteria is somewhat different in that a greater number of bytes can be in error to meet acceptance criteria. That is, the acceptance criteria permits a larger number of symbols in error per code word than in MO recording. The reason for this difference is that at the time of disk manufacture, the stamped or molded data or symbol indicia of the ROM area is not verified for corrections. Stability of the recording in the ROM area is higher than the stability of the recording in the magnetooptic area. Magnetooptic recording has been subject to growth of defects in the media itself which can actually destroy data after it has been successfully recorded. In a ROM situation, such defect growth is practically nonexistent provided the disk or medium is handled carefully.

Referring now to FIG. 1, DRP 10 during reading a sector ID for write or erase operations is separate and distinct from the DRP 11 for writing or erasing a data field. When both of these DRP's are in effect, the ERP on sector operations 12 is active. If such an ERP occurs when a wrong track is detected when reading the sector ID, a seek error retry is effected. This retry is a series of steps which include finding the track at which the optical head is scanning by reading a sector ID, calculating a track delta to the target track and then seeking to the target track. Then DRP 10 is repeated for reading the sector ID. If an incorrect track is again found, a second retry is attempted, as set forth above. If that retry is unsuccessful, then the focus and tracking circuits are recalibrated for effecting a more successful seek. Following these calibrations, a second plurality of seek attempts, as described above, are attempted. If the repeated seek attempts do not seek to the desired track, then other recovery procedures beyond the scope of the present description are effected. If a successful seek is obtained during the seek ERP 12, a soft error has occurred and the sense data generated in association with those retries are sent to the host processor for later evaluation, such as by a maintenance person. If a seek is completely unsuccessful, a hard error has occurred. In this later case, the operation is aborted with the error and generated sense data being sent to the host processor for evaluation either by error recovery procedures in the host processor or by manual intervention. During DRP 10, the number of errors that are detected in the sector ID portion are monitored to determine whether or not reassignment of data stored in the data field to another sector is required.

Following a successful recording through steps 10 and 11, the DRP 14 is entered for effecting a write verify. First the sector ID is read, the procedure in DRP 14 is quite similar to that of DRP 10. Then at DRP 15, the just recorded data field is read using the criteria set forth in Table I. Upon completion of DRP 15, the writing operation is complete. This operation may include reassignment of the data to sectors other than the originally assigned sector.

During a usual read operation i.e., recovery of recorded data from the disk medium to be used by the host processor and at which time the host processor usually does not in fact have an image or a copy of the data to be read. The sector ID DRP 16 first ensures that the correct sector is being read. Such DRP 16 may include error recoveries as will become apparent. Then, in DRP 17, the reading of the data field is verified which may include several retries and recalibrations, as will become apparent. If during DRP 17, the data is successfully read but does not meet the appropriate criteria, then the data read from the disk medium are reassigned and rerecorded at a sector other than the sector just being read. After a successful reassignment of the data to another sector, the data is sent to the host processor. If, after a certain number of unsuccessful reassignment tries, then the data is sent to the host processor with sense information indicating device error and the status of the read operation, i.e. data is recovered but the high criteria are not met. The sector just being read then is taken out of service (demarked as being defective). It should be noted that there is a substantial difference between the DRP 17 and the DRP 15 in that during DRP 15 the host processor has a valid copy of the data being recorded whereas in DRP 17 the host processor does not have a valid copy of such data.

DRP's 18 and 19 pertain to reading a ROM sector. DRP 18 relates to reading the sector ID while DRP 19 relates to reading the data field. Error conditions in either the sector ID or the data field can cause reassignment of the data to a MO sector for recording therein. Of course, a disk that is entirely ROM does not enable reassignment. In this regard, a "ROM only" disk can be provided with a write once area (such as ablative or bubble recording) to enable limited data reassignment. This action avoids the error condition of the ROM sector. The ECC error level monitor 13 applies to DRP's 15, 17 and 19. In this regard, the invention of Devore et al. supra is employed in part for effecting these functions. There are also some added control provided by the present invention over and above Devore et al. supra.

Figure 3:
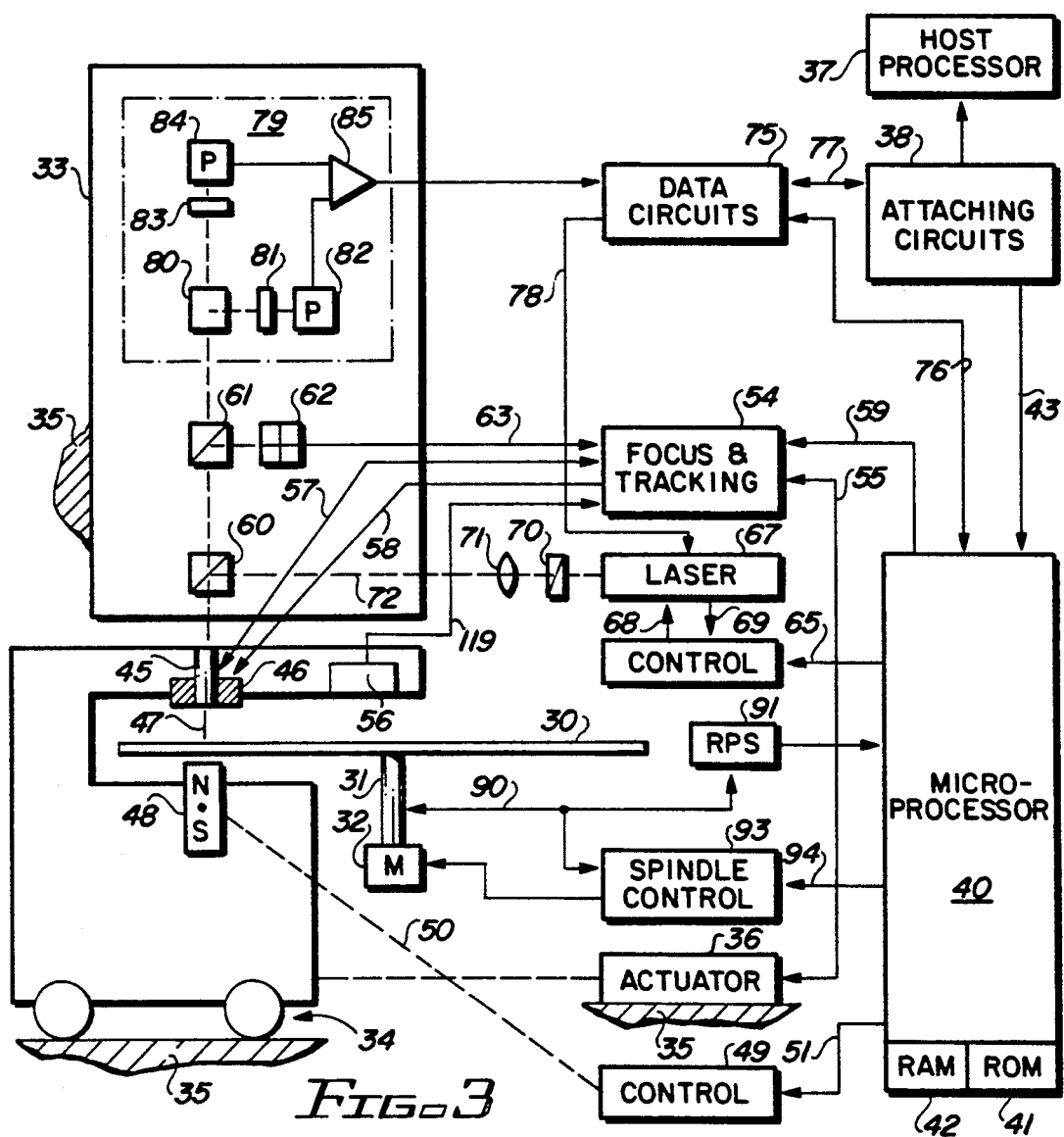
FIG. 3 is a simplified block diagram of an optical disk recorder in which the present invention advantageously is practiced.

FIG. 2 illustrates, in simplified form, machine operations which effect utilization of the high and low criteria for error control using the principles of the present invention. The term function, as used in FIG. 2, relates to recording or writing data to disk, reading such data, write verifying such data, or erasing such data as referred to in Table I and FIG. 1. FIG. 2 is applicable to each of the separate listed DRP functions of Table 1. A first step in error control is to perform the function in step 20 at high criteria. Then at step 21, the recorder checks to see if an error occurred. If not, the machine operations proceed to the next usual operation, such as from reading a sector ID to performing a desired function on a data field such as recording, erasing, or reading. If an error is detected at step 21, i.e., an error that is not corrected by ECC, then at step 22 has the maximum number of retries (retry max) been reached. If not, the function is tried again. The number of retries, of course, is tallied each time they are effected, as is known in the art. Once the maximum retry number has been exceeded, as detected at step 22, then at step 23 focus and tracking circuits 54 (FIG. 3) are calibrated to ensure that the error is not induced by poor focus or tracking operations. Following the calibration, at step 24, the function is again performed at high criteria. If no errors are detected at step 25, then at step 34A it is determined whether or not a reassignment is to be effected. If not, the machine operations proceed to the next normal set of operations. If reassignment is needed, then a reassignment procedure, later described, is effected. If an error is detected at step 25, then a reassignment flag (not shown) is set at step 26 followed by performing the same function at low criteria in step 27. In an alternate form of the FIG. 2 illustrated procedure, steps 24 and 25 may be dispensed with such that a reassignment need is noted and the function to be performed is only retried at low criteria in step 27. If an error is detected at step 28, then reassignment may be required or other error recovery procedures effected. At step 29, if reassignment is required and possible, it occurs as will become apparent. If reassignment is not required or permitted, then error status is sent to a host processor 37 (FIG. 3). If no error is detected at step 28, the reassignment needs are assessed at step 34A and the machine operations proceed to normal operations without a reassignment of the data to another sector. When FIG. 2 represents a read operation, data is not sent to a host processor until high criteria are met or after a reassignment and recording the data in a different sector, has been successfully effected.

Before going into the details of how the procedures and criteria are effected in accordance with the present invention, the environment in which the present invention is advantageously practiced is shown in FIG. 3. A magnetooptic record disk 30 is mounted for rotation on spindle 31 by motor 32. Optical portion 33 is mounted on frame 35. A headarm carriage 34 moves radially of disk 30 for carrying an objective lens 45 from track to track. A frame 35 of recorder suitably mounts carriage 34 for reciprocating radial motions. The radial motions of carriage 34 enable access to any one of a plurality of concentric tracks or circumventions of a spiral track for recording and recovering data on and from the disk. Linear actuator 36 suitably mounted on frame 35, radially moves carriage 34 for enabling track accessing. The recorder is suitably attached to one or more host processors 37, such host processors may be control units, personal computers, large system computers, communication systems, image signal processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random-access memory (RAM) 42.

The optics of the recorder include an objective or focusing lens 45 mounted for focusing and radial tracking motions on headarm 33 by fine actuator 46. This actuator includes mechanisms for moving lens 45 toward and away from disk 30 for focusing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnet 48 in a constructed embodiment (magnet 48 is an electromagnet) provides a weak magnetic steering field for directing the remnant magnetization direction of a small spot on disk 30 illuminated by laser light from lens 45. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on disk 30 normally are "north pole remnant magnetization". To erase disk 30, magnet 48 rotates so the south pole is adjacent disk 30. Magnet 48 control 49, which is operatively coupled to rotatable magnet 48 as indicated by dashed line 50, controls the write and erase directions. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the fine actuator 46 control by circuits 54 is exercised through control signals travelling to fine actuator 46 over lines 57 and 58, respectively for effecting respective focus and track following and seeking actions. Sensor 56 senses the relative position of fine actuator 46 to headarm carriage 33 to create a relative position error (RPE) signal. Line 57 consists of two signal conductors, one conductor for carrying a focus error signal to circuits 54 and a second conductor for carrying a focus control signal from circuits 54 to the focus mechanisms in fine actuator 46.

The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photoelements which respectively supply signals on four lines collectively denominated by numeral 63 to focus and tracking circuits 54. Aligning one axis of the detector 62 with a track center line, track following operations are enabled. Focusing operations are achieved by comparing the light intensities detected by the four photoelements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser, such as a gallium-arsenide diode laser, can be modulated by data signals so the emitted light beam represents the data to be recorded by intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplying suitable control signals over line 76. Microprocessor 40 in preparing circuits 75 is responding to commands for recording received from a host processor 37 via attaching circuits 38. Once data circuits 75 are prepared, data is transferred directly between host processor 37 and data circuits 75 through attaching circuits 38. Data circuits 75, also ancillary circuits (not shown), relating to disk 30 format signals, error detection and correction and the like. Circuits 75, during a read or recovery action, strip the ancillary signals from the readback signals before supply corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the headarm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photocell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photocell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal-controlled oscillator for controlling motor 32 speed, as is well known. Microprocessor 40 supplies control signals over line 94 to control 93 in the usual manner.

Referring now to FIG. 4, the format of track zones on disk 30 is illustrated in diagrammatic form. Each optical disk is divided into circumferential radially extending addressable data-storing sectors. Such sectoring is similar to that used on current-day magnetic recording disks. Only one sector 100 is detailed in FIGS. 4 and 5 for purposes of simplicity. A pair of later-described preformatted sector areas 98 and 99 are on radially extending lines from the center of the disk at spindle 31 to the outer edge of the disk. Such sectoring is limited to the recording area as is known. Numeral 100 denotes one sector which extends from the leading circumferential extremity of sector mark 98 to the leading circumferential extremity as a next sector mark 99. Typically, a relatively large number of sectors are circumferentially arranged on a optical disk 30. FIG. 4 shows an optical disk which has a magnetooptic (MO) recording area 101 in a radially inward portion and a pre-recorded area 102 (pre-recording includes embossing or molding the data indicia in the medium) at the outer radially periphery. Radial placement of such areas is arbitrary. The MO recording area 101 is divided into a plurality of radial zones, each zone having a predetermined number of recording tracks. A radially inward most zone 103 is a control area for recording directories and other control information. Calibration tracks may also be provided in area 103. A first zone of data storing tracks consists of a band 104 of tracks which are primarily assigned to store data from a host processor and a second band of tracks 105 which provide spare sectors for the tracks in band 104. Such banding in one zone does not preclude the assignment of spare sectors within a data track in band 104. Of course, the number of tracks in band 104 are much greater than the number of tracks in band 105. The second zone of data storage consists of a band of tracks 106 which primarily store data and a band of tracks 107 which provide spare tracks for the tracks in band 106. A third zone of tracks includes a band of tracks 108 which primarily store user data from a host processor and a band of spare tracks 109. The number of zones in MO area 101 can be determined for each separate storage application. ROM area 102 is shown as having but a single zone which consists of a band of tracks 110 which store data in embossed form. A band of tracks 111 in the MO area 101 provide spare tracks for receiving reassigned data from ROM area 102. From the above description, it is seen that the spare tracks are located in close proximity to user tracks. This is important in the MO area because of the expected high media error rate.

FIG. 5 illustrates, in simplified form, the format of a single sector 100 of which disk 30 has a large multiplicity. A sector 100 of a track 115 can be in any of the zones in either the MO area 101 or ROM area 102 (FIG. 4). The scanning of track 115 proceeds in the direction of the arrow 114. Arrow 114 indicates that the relative motion of the disk 30 with respect to the stationary scanning beam from light path 47 (FIG. 3). The leading portion of sector 100 consists of a sector preformatted (preferably pre-recorded) control area 125, which in many optical disks is embossed or molded into the disk surface. In a soft sectored optical disk, such preformatted area 125 is recorded either at time of manufacture disk certification, or in situ by a user's disk recorder. The leading field of sector 100 is sector mark SM 116 which is a five byte ROM recording designed to be detected without recourse to the use of timed readback circuits, such as phase lock loops. The recorded pattern in SM 116 does not exist in the other areas of the sector i.e., is not data. Preferably, SM 116 consists of alternating bit patterns having relatively long one-half wavelengths. The recorder clock or phase lock loops (PLL) in data circuits 75 are synchronized to disk rotational speed by sensing clock or PLL synchronization (VFO) fields.

Each sector control area 125 has three copies 118-120 of the sector identification, hereinafter sector ID. Each sector ID includes a Variable Frequency Oscillator (VFO) portion, an address mark portion and an ID and CRC portion. A first VFO field in sector ID copy 118 has a signal pattern, VFO1 is a series of repetitive signal patterns for effecting desired frequency and phase synchronization of the PLL (not shown) in data circuit 75 of FIG. 3. Various patterns are known and can be used. The second and third copies 119, 120 of the sector ID have a VFO field VF02 to provide bit and byte synchronization. VF02 consists of sixteen recorded byte positions having a predetermined pattern. Next encountered in the scanning of each copy 118, 119 and 120 is the ID & CRC portion. Each of the portion contains the track number in which the sector resides i.e., track number denotes the radial position of the track, and as well as the sector number which denotes the circumferential position of the sector 100 on disk from an index mark (not shown). Included in each ID & CR portion is a cyclic redundancy check (CRC) redundancy which validates the accuracy of the readback of the track and sector numbers from each copy of the sector ID. For many disks, the sectors are sequentially numbered from one radial extremity of the data storing area to the opposite radial extremity, i.e., separate track and sector numbers are not used. The plural copies of the sector ID increases the reliability of the reading and writing operations on disk 30.

PA field 122 stores a postamble. This postamble enables the use of a run-length-limited (RLL) 2,7 d,k code and enables complete framing of the last byte of data in the preceding ID CRC field 123. Following field PA 122 is ODF/GAP 126. ODF is a track following offset detection area, also termed a mirror mark. The control area 125 and the data area identified by numbers 127-132 are in grooved portions of a disk 30. ODF is a radial line extending across the recording area in which no grooves occur i.e., acts as a first surface mirror interrupting the grooves of the disk. At the trailing end portion of field 126, and within a groove is a gap area which is unformatted within the groove for allowing elapsed time to enable an optical disk recorder to complete processing of the sector control area 125 and allows for transition from reading to writing mode i.e., such as reversing the magnetization or bias field represented by numeral 48 of FIG. 3. Other control information may be recorded within this gap as desired. Then, the next encountered clock synchronizing field VFO3 field 127 which is also termed the data field VFO sync. This field has its own synchronizing pattern of signals. Following field 127 is a data synchronizing or framing field S 130 which is a multiple byte synchronizing pattern particularly adapted for aligning PLL/decoder operation to the signals recorded in data field 131 on a d,k code element boundary. Data field 131 has a predetermined number of data bytes including ECC redundancy bytes and resynchronization bytes, as seen in FIG. 6. PA field 132 is postamble to the data field 131 for enabling complete framing of the above mentioned RLL 2,7 block coding for recording on disk 30. Included with PA field 132 is a speed buffer or gap for accommodating various disk 30 rotation speeds during recording or writing and erasing operations. The next sector 134 to be scanned begins with SM 133 which is identical to SM 116.

Referring next to FIG. 6 the logic construction of S or data sync fields 130 and data field 131 is described. Sync field 130 consists of three framing bytes SB 137 for identifying or framing PLL operations to the boundaries of the d,k code symbols. Part of the error control is to measure the validity i.e., effectiveness, of the SB sync bytes and require this predetermined number of the sync bytes SB to be valid for ensuring reliable error correctable readback of data recorded within data field 131. Data field 131 consists of a series of interleaved segments which are ECC determined, separated by resync bytes RS which facilitate the correction of data errors in the data field. Pairs of interleaved segments are separated by a single resync byte RS 140. The first two interleaved segments 138 and 139 are first scanned by the reading beam 47 following scanning the S field 130. Resync byte RS 140 separates interleaved segment 139 from the second pair of interleaved segments which begin with interleaved segment 141. Ellipsis 142 represents a large plurality of paired interleaved segments respectively separated by resync byte, not shown. The end of data field 131 consists of two interleaved segments 146, each containing ECC redundancies. The pair of ECC redundancy-containing interleaved segment 146 is separated from the adjacent data containing code words (not shown but represented by ellipses 142) is resynchronization to byte RS 145. The resynchronization (resync) bytes interspersed among the data recorded in data field 131 enable reframing the data readback operations to the d,k code symbol boundaries for creating a more reliable signal readback. Reframing facilitates the power of the ECC as represented in FIG. 6 by the ECC redundancy code words 146. Each code word in data field 131 consists of all bytes of data and ECC redundancy occupying the same relative byte position in the respective interleaved segments 138-142 and 146, as represented by dimension line 147. A number of bytes in error in such code words is a factor in the high and low criteria of the present invention.

FIG. 7 is a simplified block diagram showing three control structures used with the present invention and recorded in the band of control tracks 103. It is parenthetically noted that on the radial inward portion and the radial outward portion, additional bands of tracks can provide so-called guard bands and acquisition bands for track following and seeking as is known in the art. A directory 150 identifies the physical location of user data on disk 30. In the above referred to ANSI proposed standard, the directory is called a disk definition structure (DDS). DDS contains information that enables automatic converting of relative block addresses to physical block addresses of disk 30. This directory is a table look up between the logical block addresses of the user data which may be arranged in so-called subdirectories and are directed to the sector numbers and track numbers and physical addresses. Directory DDS 150 provides addressing for not only the MO area 101 but also the ROM area 102. Primary defect list 151, written on the disk 30 at the time of its manufacture or during disk certification, contains a list of the physical addresses of defective sectors detected. If during the formatting of disk 30, the defective sectors are not given logical numbers i.e., the addressing has "slipped" along the length of the tracks, then the primary defect list may be dispersed with. Because of the characteristics of magnetooptic media, defects may occur after the disk 30 has been shipped to a user. To accommodate such new defects, as well as enlarging defects, which may effect more than one sector, the secondary defect list 152 is provided in the control track 103. This list is updated from time to time and is sorted to provide rapid identification of the defective areas. In addition, pointers to alternate sectors may be provided, either in control track 103 or in the respective data areas, alternate pointers for the ROM area 102 can be provided in the secondary defect list or a separate list may be provided in the band of tracks 111.

Arrangements are made to control the zoning of disk 30 through host processor selection. FIG. 8 is a simplified flow chart showing this operation. Before activating the recorder to format disk 30, a host processor 37 issues a modeset command at step 155. Such modeset commands are well known, however, the modeset command used for establishing zones including spare sector bands of tracks are set at step 156 by the optical disk recorder through microprocessor 40, as specified in the modeset command 155. Then at step 157, the ROM area 102 is defined in the directory 150 for enabling addressing. It should be noted that ROM area 102 is included on disk 30 at the time of manufacture, therefore, the optical disk recorder has to examine the ROM area 102 for obtaining the directory information. Alternate sectoring for the ROMs as well as for the MO area 101 can be achieved through the directory structure 150.

FIG. 9 shows a parity checked set of ROM sectors. Such a parity set of ROM sectors consists of either a complete track in ROM area 102 or one half of such a track in ROM area 102. Alternately, the parity sectors could be distributed in ROM area 102 pursuant to a distribution algorithm, not described. In any event, a ROM track 160 includes a set of sectors beginning with sector zero at S0 161 and extending through sector SN-1 162 for providing N data storing sectors. Intermediate sectors are indicated by ellipsis 163. A parity sector SP 164 is appended at the trailing end of the set of ROM sectors. The data not including ECC redundancies, in sectors 161-163 are all logically exclusive-OR'd together to generate parity bytes in SP 164 using an H matrix for generating a parity redundancy as is known and not further described for that reason. The format of the sectors S0 through SN-1 is the same as shown in FIG. 5 which facilitates the same data handling circuits in data circuits 75 as used for MO area 101. In this manner, the size of the ROM area 102 as well as the MO area 101 can be adjusted from disk 30 for accommodating various applications. A format of FIG. 9 is useful for recovering data from unreadable ROM sectors as will become apparent. In a disk having both ROM and writeable areas, whenever a parity sector is needed for correcting data, then the data, as connected, from a sector in-error is reassigned to a one of the writeable sectors. Such reassignment obviates the need for the parity correction calculations.

Figure 10:
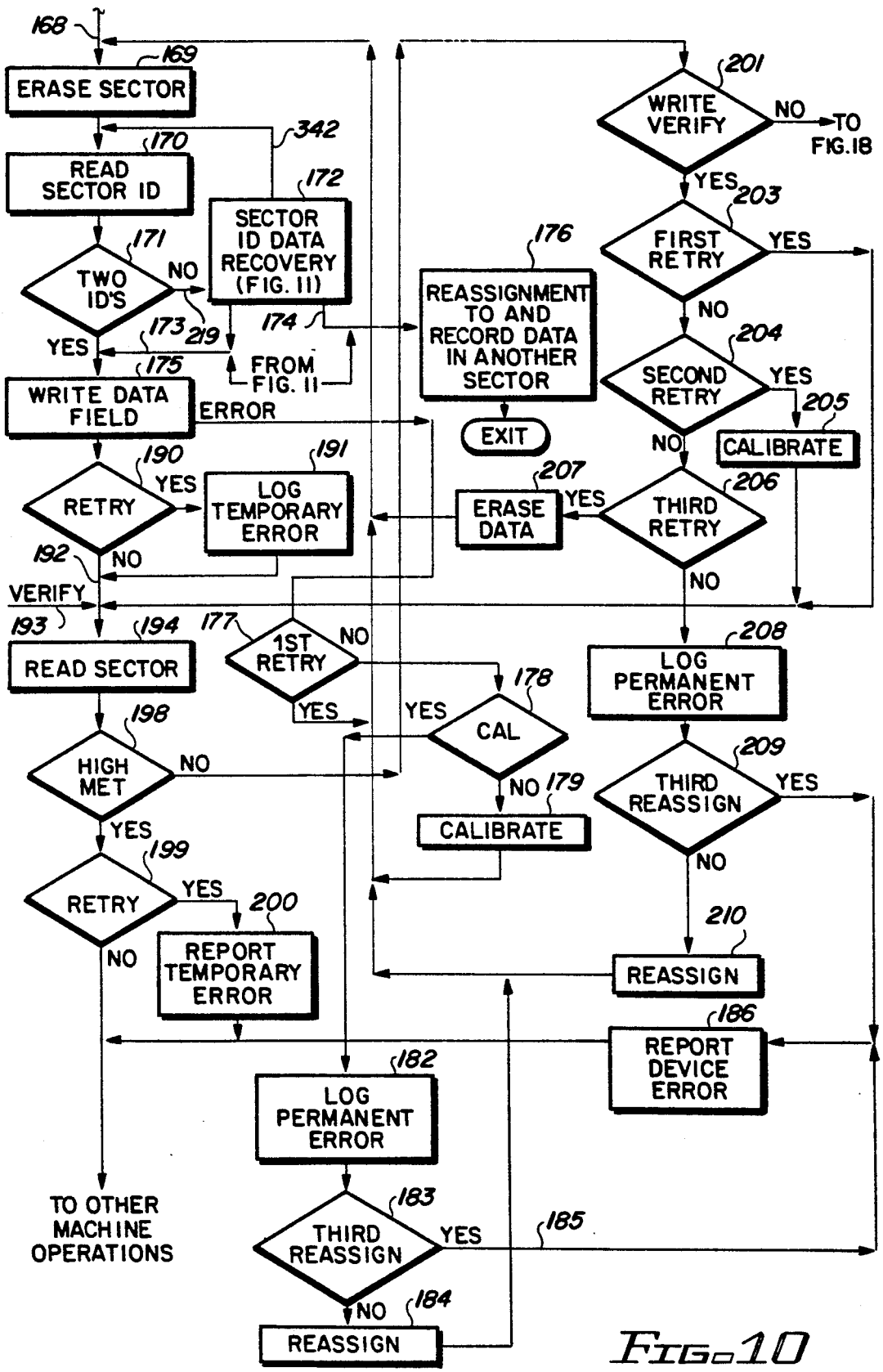
FIG. 10 shows a set of machine operations for recording data (write operation) on the FIG. 4 illustrated disk medium which employs the present invention.
Figure 11:
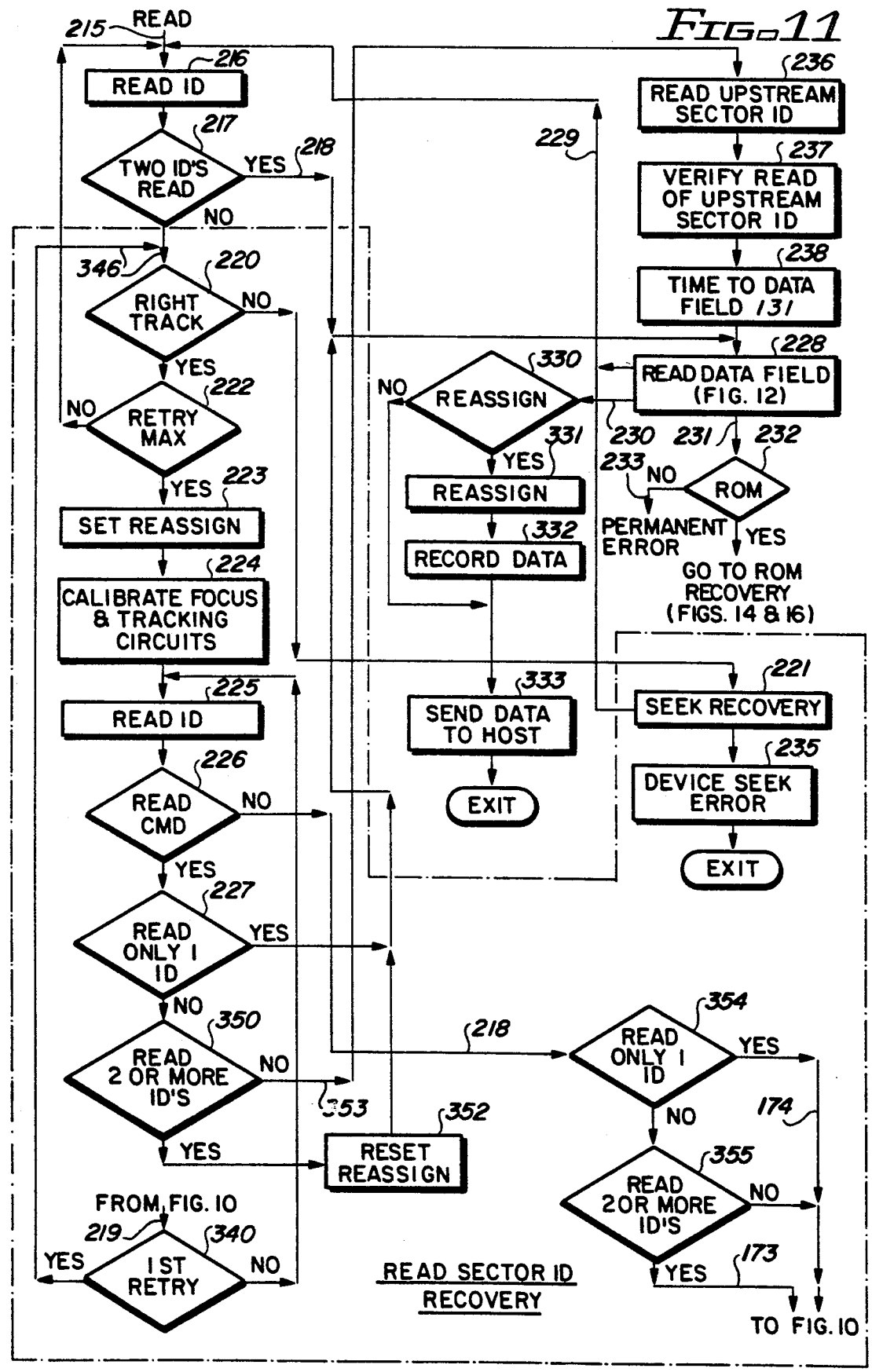
FIG. 11 is a simplified flow chart of machine operations for a read operation on the FIG. 4 illustrated optical disk medium for reading data from the medium and enabling reassignment of such data when predetermined error conditions occur.

FIG. 10 is a simplified machine-operations chart for operating the FIG. 3 illustrated optical disk recorder using the teachings and principles of the present invention. The procedures implemented in the FIG. 10 flow chart follow the principles enunciated with respect to FIG. 2. A write operation is initiated in the usual manner, indicated by line 168. This initiation includes rotational orientation of the beam along path 47 to the appropriate addressed track as by a seek operation and the rotational positioning for scanning to the sector to be read. The description of FIG. 10 assumes that this action has been completed. In an update write operation, erase step 169 erases the addressed sector in preparation for writing. Such step 169 includes reading sector control area 125 before erasing data field 131. A failure in the erase step 169 results in reassigning the data destined for the current sector to another or spare sector. Firstly, in the write operation the sector control area 125 is scanned and read at step 170. At step 171, the high criteria for a reading sector ID portion 125 during a write operation and its preceding erase step 169 is checked against the read quality (read two of the three copies 118-120 of the sector ID). For enabling recording signals in each sector, two of the copies 118-120 of the sector ID must be readable. If two of the three copies of the sector ID are not successfully read, then a DRP based upon the principles discussed above with respect to DRP 10 are invoked at step 172 i.e., sector ID data recovery is initiated. Details of recovery step 172 are shown in FIG. 11. If the sector ID is recovered at the high criteria i.e., two of the three copies 118-120 of the sector ID are successfully read, machine-operations proceed along logic path 173 to step 175 which actually records data in data field 131. If the sector ID data recovery is not successful, then, as indicated by numeral 174, the data intended for the presently addressed sector is reassigned by a host processor 37 to another sector in step 176. This reassignment of data to be written to another sector follows known techniques. Step 176 also includes sending sense information to host processor 37 which details the reassignment. If during the recording of data in step 175, an error occurs, such as during read-after-write, machine-operations proceed to step 177. At step 177 it is determined whether or not this recording step is the first retry of writing the data field by step 175. If it is the first retry, then steps 169 et seq as above described are repeated. Alternately, at the first retry only step 170 et seq may be repeated (multiple erasing may not be necessary). If it is not the first retry, i.e., it is is the second or higher numbered retry, then step 178 is performed. At step 178 whether or not the focus and tracking circuits 54 had been calibrated (CAL) is checked, if calibration during the writing attempt has not occurred, the focus and tracking circuits 54 are then calibrated at step 179 and the fact that they have been calibrated for the presently addressed sector is noted. When machine-operations proceed to another sector, the calibration notation is erased. Upon successful calibration of the focus and tracking circuits 54, the machine operations repeat steps 170 et seq as above described. Calibration step 179 corresponds favorably to step 23 of FIG. 2. If after the focus and tracking calibration has been successfully achieved and yet the sector ID cannot be successfully read, then from step 178 machine-operations proceed to step 182 to report a permanent error i.e., the high criteria, which is also the low criteria for recording data, into the instant sector are not met. Therefore, data recording into the current sector is not permitted because reading of the sector ID has not met the required criteria. At this point, the data is to be reassigned to another sector.

Another part of the error control of the present invention is to monitor the reassignment of a data from one sector to another. It is possible that an optical disk recorder could be defective and cause an endless number of unsuccessful reassignments of data to other sectors. When the medium is still good, however, some error is causing the successive unsuccessful reassignment attempts, accordingly, three successive attempted but unsuccessful reassignment attempts are permitted. After a third unsuccessful reassignment, a device error is reported as at step 186. That is, in each of the three attempted reassignments of the data to be written to disk 30, the read after write verification failed to show a successful recording of such data. When this failure repeats three times in one series reassignment attempts of data to another sector, an error condition of the recording hardware is signalled to host processor 37. Accordingly, after reporting the permanent error at step 182 for later reporting to host processor J7, the FIG. 10 machine-operations proceed to step 183 to determine the number of successive unsuccessful reassignment attempts that have occurred. If less than three reassignment attempts have unsuccessfully occurred at step 184, then a successful reassignment occurred of the data to be recorded. The number of successive unsuccessful reassignments is noted for the instant write operation. Exiting the write operation, erases the reassignment count. Such reassignment tallying is by microprocessor 40 and stored in RAM 42 using known programming techniques. A reassignment merely provides for addressability of a physical sector for the instant data which includes updating directory 150 (FIG. 7). Upon successful completion of the reassignment, the write operation is reinstituted by again trying to read the sector ID control area 125 of the newly assigned sector. If the sector ID cannot be read, of course, the above described steps are followed leading to the reassignment until a third reassignment has been detected as being unsuccessful. At this point, machine-operations proceed along path 185 to report a device error and the step 182 logged permanent error(s) at step 186. Since there is a serious device error, the write operation is aborted and no further action by the recorder is permitted until appropriate error recovery procedures beyond the scope of the present disclosure are implemented.

Of course usually writing the data field at machine step 175 is successful. Upon completing the writing of data field 131 in step 175, machine-operations at step 190 determined whether or not a retry is involved in the current writing of data. A retry may either be a read sector ID retry or retries in writing the data field 131 which includes retries effected during a later described write verify operation. A recording error line can be caused by a tracking error or a focus error. In any event, if an unsuccessful retry occurs in recording data field 131, a temporary error is logged at step 191 for later reporting by microprocessor 40 to host processor 37. This temporary error log includes the usual sense data defining the type of error and its recovery history. If no retry occurred during recording data field 131, or after logging the temporary error at step 191, the write verify procedures begin at line 192. To check the current quality of data stored in a sector, a separate verify command can be used to initiate verify operations as indicated by arrow 193. Both a write verify automatically performed after writing data to a sector and a separate verify command can be employed as indicated in Table I. The write verify consists of reading the sector at machine-step 194. Such reading is described later with respect to the regular or normal read operation in FIGS. 11 and 12. Upon completing reading the sector, at machine-step 198, it is determined whether or not the high criteria are met. In most write operations, the high criteria will be met. At machine step 199, whether or not a write retry was required to achieve meeting the high criteria is checked. If such a write retry was required, then at step 200 the temporary error as well as other errors, if any, is reported to host processor 37. Programming in the host processor 37 may take note of the errors reported at step 200 to independently determine to reassign the data from the present sector to another sector. Such reassignment is beyond the present description. If there was no retry indicated at machine step 199, the write operation for the instant sector is exited to other machine operations.

Returning to machine "high criteria met" checking step 198, if the high criteria are not met, then at step 201 it is determined whether the verification is a write verify (entry into the verify operations are over path 192) during which host processor 37 has a copy of the data just recorded or a verify command (entry into the verify operation is over path 193) during which host processor usually does not have a valid copy of the recorded data. For a write verify, steps 203 et seq are performed while for a separate verify the machine operations shown in FIG. 18 are performed. Assuming a write verify, a step 203 machine operations determine whether or not the current retry is the first retry. If it is the first verify retry, then operations represented by step 194 are repeated. If it is a higher numbered retry, then at machine step 204 it is determined whether or not it is the second retry. If it is the second retry, then the focus and tracking circuits 54 are calibrated at machine step 205 and the read sector step 194 is repeated. If it is not the second retry at step 204, then it is the third or higher retry. Then at machine step 206, it is determined whether or not it is the third retry. If it is the third retry, the data recorded at step 175 is erased in machine step 207. From step 207, the write operation is reinitiated for trying to write the data so it can be successfully read by the write verify operation. Note that this is recorded as the third retry in RAM 42 by microprocessor 40. If at machine step 206 it is not the third retry, then it is the fourth retry. If it is the fourth retry, then it is assumed that recording of the current sector cannot be successfully achieved; at machine step 208 a permanent error is logged for later reporting to the host processor 37 and the data area is reassigned because the write verify or verify was unsuccessful. At machine step 209, the number of reassignments in succession for attempting to write a record to the current sector on disk 30 is determined. If less than three successive reassignment attempts were unsuccessful, then at step 210 the data to be recorded is assigned to another sector and the write operation is repeated for that other sector. At this point, the retry tally for the sector as above described is erased, such that the new sector will start out with a clean slate of retry counts. The reassignment count is maintained for checking device operations. If at step 209 three reassignment attempts were all unsuccessful i.e., this is the fourth attempt at reassignment, then step 186 is effected for reporting a device error and all other logged errors. Then other machine operations are performed depending on system architecture, rather than logging errors in RAM 42 for later reporting to host processor 27, errors can be immediately sent to host processor 37.

Referring next to FIG. 11 a read operation implementing the present invention is described. The read operation begins at line 215; all of the reassignments counts and retry counts are reset to zero and the beam on path 47 has been positioned at the current sector to be read. At step 216 the device reads the sector control area 125 as above described for the write operation. Machine step 217 checks whether or not at least two of the three sector ID copies 118-120 (FIG. 5) were successfully read; if yes, then the high criteria for reading the sector ID during a read operation have been met allowing the data field 131 to be read at machine step 228, as detailed in FIG. 12. Successfully reading the sector ID includes verifying that the sector ID identifies the sector being addressed, i.e., includes address checking. If, however, two of the three copies 118-120 of the sector IDs were not successfully read at step 216, then the operations proceed over line 346 to machine operations 172 for attempting a recovery from not meeting high criteria during reading the sector ID. Machine steps described within sector ID data recovery 172 are also used in the write operation as described for FIG. 10.

The first machine operations in recovery 172 is at step 220 to determine whether or not the beam from path 47 is scanning the right track. If the beam is not on the right track i.e., the sector ID was successfully read but does not match the target sector ID, then a seek recovery is effected at machine step 221. The seek error is suitably logged in step 221. Such seek recovery was described earlier and not repeated here. Upon completion of the seek recovery, the read ID step 216 is repeated. If at step 221, it is determined that the number of seek retries exceeds a predetermined number, then a device error has occurred in the seek circuits of focusing and tracking circuits 54. At this point, a device error is reported at machine step 235 where upon the read operation is aborted. Error recovery beyond the present description is required for recovering from such a seek error. Tallying the number of seek retries is achieved by microprocessor 40 creating a seek retry tally in RAM 42. When leaving the instant sector after a successful seek recovery retry, a temporary seek error is to be later reported to host processor 37 in the usual manner.

If on the other hand, which is the usual case, the light beam of path 47 is scanning the addressed track, then at step 222 it is determined whether or not the maximum number of retries (retry MAX) has been reached i.e., the maximum number of retries for reading the sector ID using the high criteria have been executed. If not, step 216 is repeated. If the maximum number of retries at the high criteria has been reached, then at step 223 a possible reassignment of the data is set by storing a mark to that effect in RAM 42 for the current sector being read. At step 224 the focus and tracking circuits 54 are calibrated. While it is preferred that both focus and tracking circuits be calibrating either the focus or tracking circuits but not both are within the scope of the present invention. Then at step 225 the sector ID is again read. Machine step 226 then determines whether or not the current command is a read command. For a read command, machine operations proceed to count the retries, up to a maximum of three in the present embodiment. At machine step 227, the number of successfully read copies 118-120 of the sector ID is checked. If only one copy was read then machine step 228 is executed for reading the data field 131 (A temporary error is logged to be later reported to host processor 37 at the completion of the command execution during so-called ending status). If more or less than one copy 118-120 of the sector ID was read, at machine step 350 were two or more copies of the sector ID read; if two or more copies 118-120 of the sector ID were read then the reassign bit set at step 223 is reset at machine step 352 (this later action requires reporting a temporary error to host processor 37) then step 228 is executed for reading data field 131. If at step 350, if two or more copies of the sector ID were not used, then none of the copies 118-120 were read. When none of the sector ID copies for the current sector are readable; the machine steps 236 et seq are performed for attempting to read data field 131.

If during a read operation none of the sector ID copies 118-120 are readable, then from step 350 machine operations proceed over path to step 236 whereat the error recovery procedure reads a sector ID of an upstream sector. Such upstream sector ID is for the sector scanned by the path 47 light beam immediately before scanning the current sector. At step 237 reading the upstream sector ID's 119 success is verified. If the upstream sector ID read was successful, then the data field of the upstream sector is skipped. At step 238, a time out times the scanning of the beam on path 47 to the data field 131 of the current sector. This is possible because all the sectors are of the same size, the rotational speed of disk 30 is known, therefore, the elapsed time from the upstream sector ID read at step 236 is known to the onset of the data field 131 as indicated by the ODF and gap 126. As an alternative, the two ODFs 126 in the upstream sector and in the current sector can be counted for identifying the onset of data field 131.

In FIG. 11, from steps 217, 227, or step 352 over path 218, the read data field operation 228 is initiated. If the reading of data field 131 (FIG. 5) is not successful, then a retry of the reading the current sector is initiated as indicated by numeral 229 leading from step 228 to steps 216, et seq. Usually, reading the data field 131 at step 228 is successful, path 230 is followed to exit the read operation for performing data reassignment checking and for presenting ending status to the host processor 37. If the data field 131 cannot be read during step 228, through the later described retries using the principles of the present invention, machine operations proceed over path 231 to decision step 232. At step 232, whether or not the instant sector is a ROM sector from area 102 or an MO sector from area 101 is determined. If the current sector is a ROM sector, then machine operations proceed over path 234 to a ROM recovery as described later with respect to FIGS. 14–16. On the other hand, if the current sector is a MO sector, then a permanent error is reported by following the machine operations path 233. A permanent error in a read operation requires error recovery procedures beyond the present description.

Upon a successful read of the data field 131 at machine step 228, machine operations proceed over path 230 to machine step 330. At machine step 330 whether or not the reassign flag of RAM 42 is set is verified by microprocessor 40. If the reassign flag is not set (high read criteria are met), then at machine step 333 the data are sent to host processor 37. This step represents either of two operations. If the FIG. 3 illustrated device has no buffer nor cache memory, then the data signals can be sent to host processor 37 but are not verified as being valid. In this instance, step 333 consists of sending so-called ending status which indicates to host processor 37 that the data is valid and which completes the data transfer. When the FIG. 3 illustrated device has sufficient buffering or caching capabilities, then the data, in fact, is retained in the device until it is validated and ready to be sent to host processor 37 at machine step 333.

Figure 12:
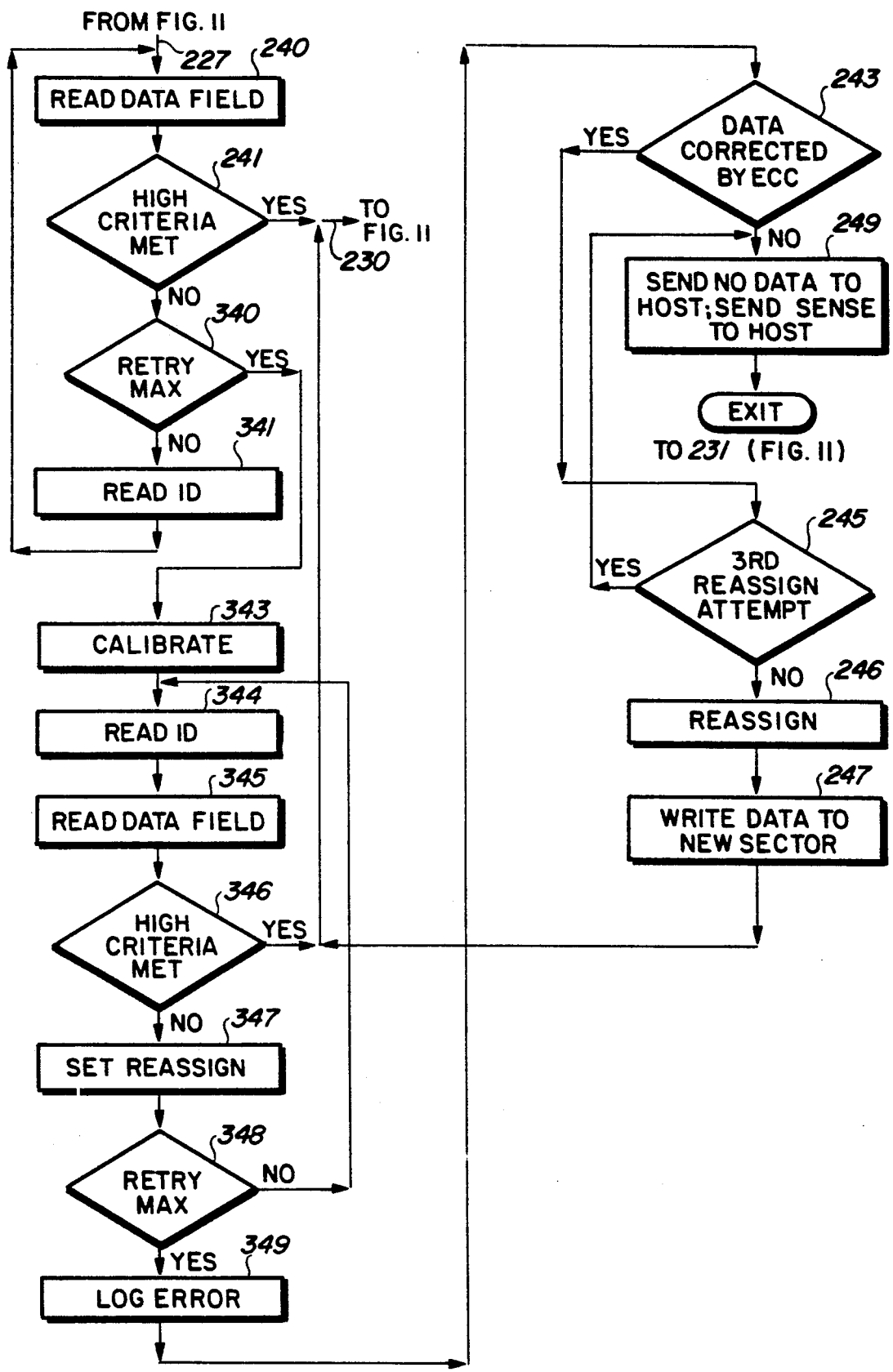
FIG. 12 is a flow chart which shows reading a data field from the optical disk of FIG. 4 including applying the present invention for error control in such reading.

When the reassign flag or bit of RAM 42 was set (such as at step 223), then the just-read data is to be stored in another sector than the current sector before the data are sent to host processor 37 or validated as correct data. At machine step 331 the addressing for the reassignment of the data is effected, i.e. the new sector to receive the data from the disk that was successfully read but not meeting the high criteria is identified and stored in DDS 150 (FIG. 7) but not validated as being stored. At machine step 332 the just-read data residing in data circuits 75 (as in a cache or buffer) are recorded in the new sector using the FIG. 12 illustrated machine operations. If the data were sent to the host processor 37, then such data are retrieved from host processor 37 for recording in the new sector. Step 333 is performed upon successful completion of recording the just-read data in the new sector. Using this reassignment and re-recording process initiated in the device, the quality of the recording on disk 30 is maintained.

The machine operations 172 are also used in connection with the write operations of FIG. 10. From FIG. 10, entry into machine operations 172 is at step 340 over path 219. If the write retry is the first retry attempt, then the focus and tracking circuits 54 are to be calibrated and the seeking operation is to be verified. Accordingly, steps 220 et seq are performed for effecting these desired operations. On the other hand, if the retry is second or later retry, then the calibration is dispensed with by executing steps 225 and 226, supra. At machine step 226 when the host command being executed is not a read command, it is a FIG. 10 illustrated execution of a write command. From machine step 226, the write recovery operations proceed over path 218 to step 354 for checking if only one copy 118–120 of the sector ID was read. If yes, machine operations return to the FIG. 10 illustrated operations over path 174 to machine step 176. If other than one copy of the sector ID was read, machine step 355 determines whether two or more copies of the sector ID were read; if yes, machine operations are reentered via path 173 to step 175, i.e., high criteria were met. If at machine step 355, two or more copies of the sector ID were not read, then no copy was read. In this instance, return to the FIG. 10 illustrated machine operations via path 174 is made.

FIG. 12 illustrates in flow-chart-form details of read data field 228 step of machine operations shown in FIG. 11. First the FIG. 3 illustrated device is reading the data field 131 in step 240. Uncorrectable error status is checked in step 241. If high criteria are met, then path 230 is followed to step 330 of FIG. 11. From machine step 241, if the high criteria are not met (see Table I), then at step 340 a read retry count (retry MAX) is checked to see if a maximum number of retries at the high criteria have been performed. If not, the sector control area 125 is again read at step 341 and a data field read is repeated at step 240 (it should be noted that each cycle of retry requires a rotation of disk 30 and that the retry count is incremented). If at step 340 the maximum number of retries has been reached, then at step 343 focus and tracking circuits 54 are calibrated. It should be noted that such calibration requires a seek to the calibration tracks as well as several rotations of disk 30. It is preferred that both the focus and seeking circuit portion be calibrated, no limitation thereto intended. After the calibration step 343, the sector control area 125 is again read at step 344. Note that the step 344 includes retries as shown above in FIG. 11 in steps 216, et seq. Following a successful read of the sector ID, at step 345 the data field 131 is again read. Then, at step 346 the error state of read data field step 345 is detected. If the data is read and any data errors are corrected, then steps 330 et seq of FIG. 11 are performed. If, however, at step 346, the number of corrected errors exceeds the high criteria for reading data, then at step 347 a reassign flag (not shown) is set in RAM 42. Machine operations at step 348 check whether or not the maximum number of retries has been exceeded. If not, the steps 344 et seq are repeated trying to overcome the failure to meet the desired high criteria. If the maximum number of retries have been exceeded, then an error is logged at step 349 for later reporting to host processor during ending status.

At step 243, the status of the data errors in the corrected data is checked. If the error correcting code corrected the data, then the machine operations at step 245 check to see if a third reassignment attempt was made. If not, then the data are reassigned at step 246, recorded in the new sector at step 247, then the operation proceeds over path 230 to step 330 of FIG. 11. If at step 243 the data errors were not corrected or at step 245 a third reassignment was attempted, then at step 249 no data is sent to the host processor 37 and a device error is reported. Machine operations then exit the illustrated operations.

Figure 13:
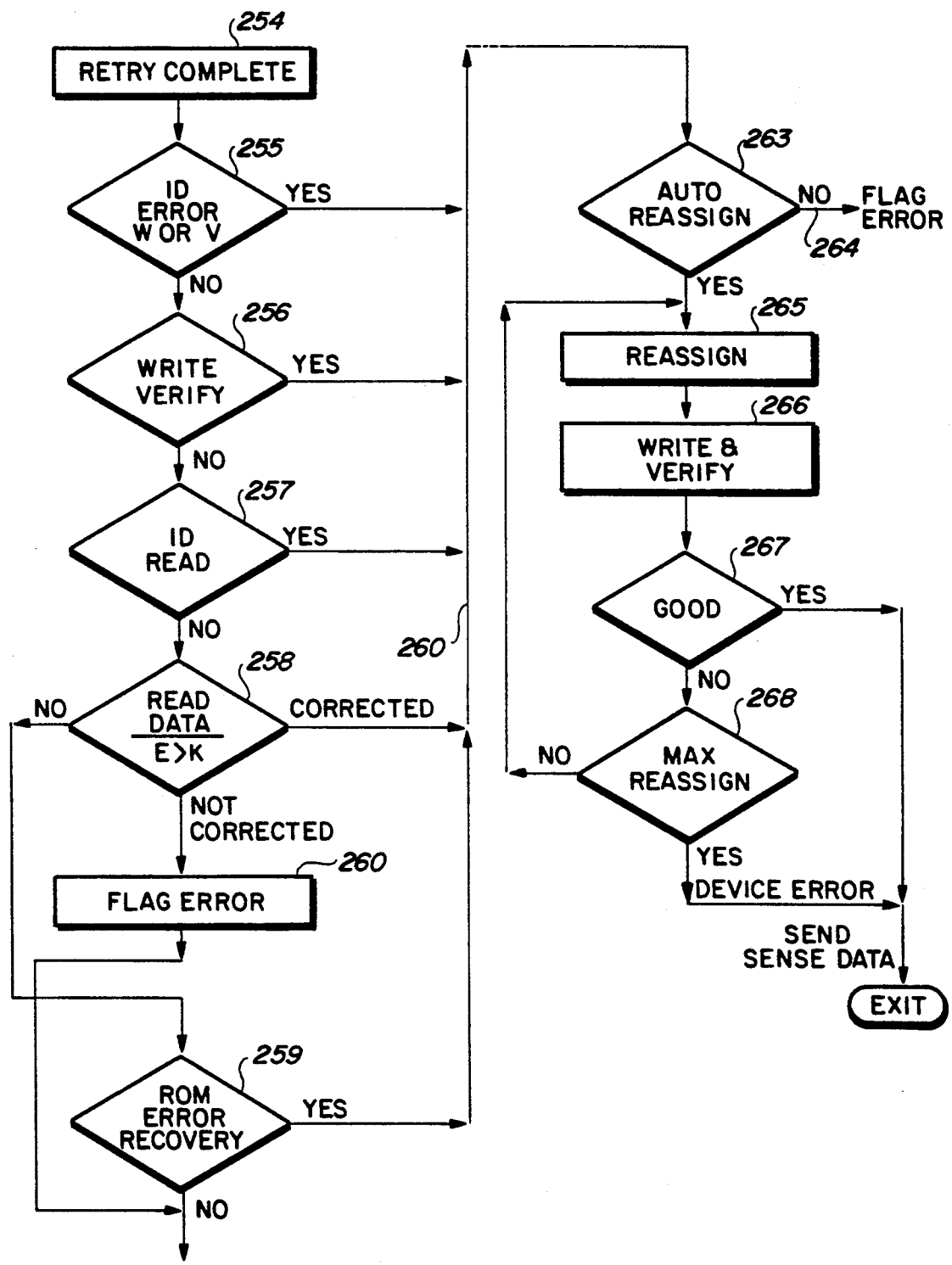
FIG. 13 is a simplified flow chart showing automatic reassignment based upon retry results using high and low criteria of the present invention.

FIG. 13 is a flow chart of reassignment machine operations. Any retry completed as at step 254 is as described earlier with respect to FIGS. 10-12. At step 255, machine operations check for reading a sector ID error in write or write verify (ID error W or V). When such an error has occurred, then later described steps 263 et seq are performed. If it is not a read ID error, then at step 256 the write verify status is checked for reading the data for verifying appropriate recording as shown in FIG. 10. When such an error has occurred, then the reassignment of data to another sector is based upon obtained data from the host processor 37 rather than from using the data successfully read from disk 30. Step 257 senses for the sector ID error during a read command; this error also can cause a reassignment of data. This type of error is also reported to host processor 37. If the error is not from reading a sector ID 119, then at step 258, the retry was caused by failure to meet error detection criteria for reading data field 131. If at step 258 the data was successfully read, however the number of errors E exceeds the criteria K, then steps 263 et seq are performed. If the number of errors does not exceed the criteria, then step 259 is entered for determining a ROM error recovery procedure. If the permitted number ROM errors were exceeded, then steps 263 et seq are entered for reassignment of the ROM data to the MO tracks 111. Otherwise, the machine operations shown in FIG. 13 are exited. The FIG. 13 illustrated machine operations are effected by programming which is embedded into read, erase and other content programs in a usual manner.

Returning to machine step 258, if the MO area read error condition resulted in not being able to correct the data, a permanent error is flagged at step 260. Line 261 connects operative steps 255-259 at their respective "yes" outputs to enter machine steps 263 et seq. If the auto reassign flag, as set forth in the above mentioned ANSI proposed standard, is set to off i.e., the programming in host processor 37 wants to handle the reassignment, then as indicated by numeral 264 the error is flagged and reported to host processor 37. It is up to host processor 37 then to take the read data, whether for a write operation which it already has or the data just read from the disk 30, to effect a reassignment and then rerecord the data onto disk 30. If the auto reassign flag is active, then at step 265 data reassignment is performed, as above described. At machine step 266, the write and verify operation set forth in FIG. 10 are performed. At step 267 a successful write is checked and if it is successful, then the machine operations shown in FIG. 10 are exited with the sense data describing the error being forwarded to host processor 37. On the other hand, if the attempted reassignment was unsuccessful, then at machine step 268 the maximum number of reassignments is checked i.e., have there been three unsuccessful reassignments to date. If yes, a device error is reported and machine operations are terminated. If the maximum number of reassignments have not been reached, then steps 65 et seq are repeated.

Figure 16:
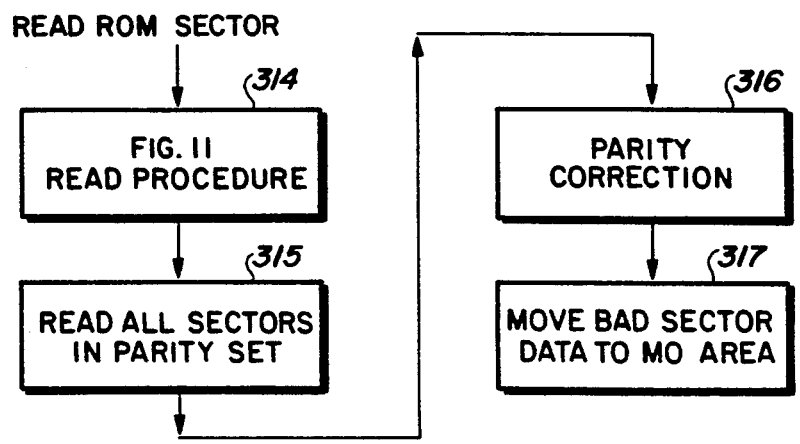
FIG. 16 is a simplified flow chart of machine operations showing error recovery from an unreadable ROM sector and reassigning same to a magnetooptic area of the disk shown in FIG. 4.
Figure 14:
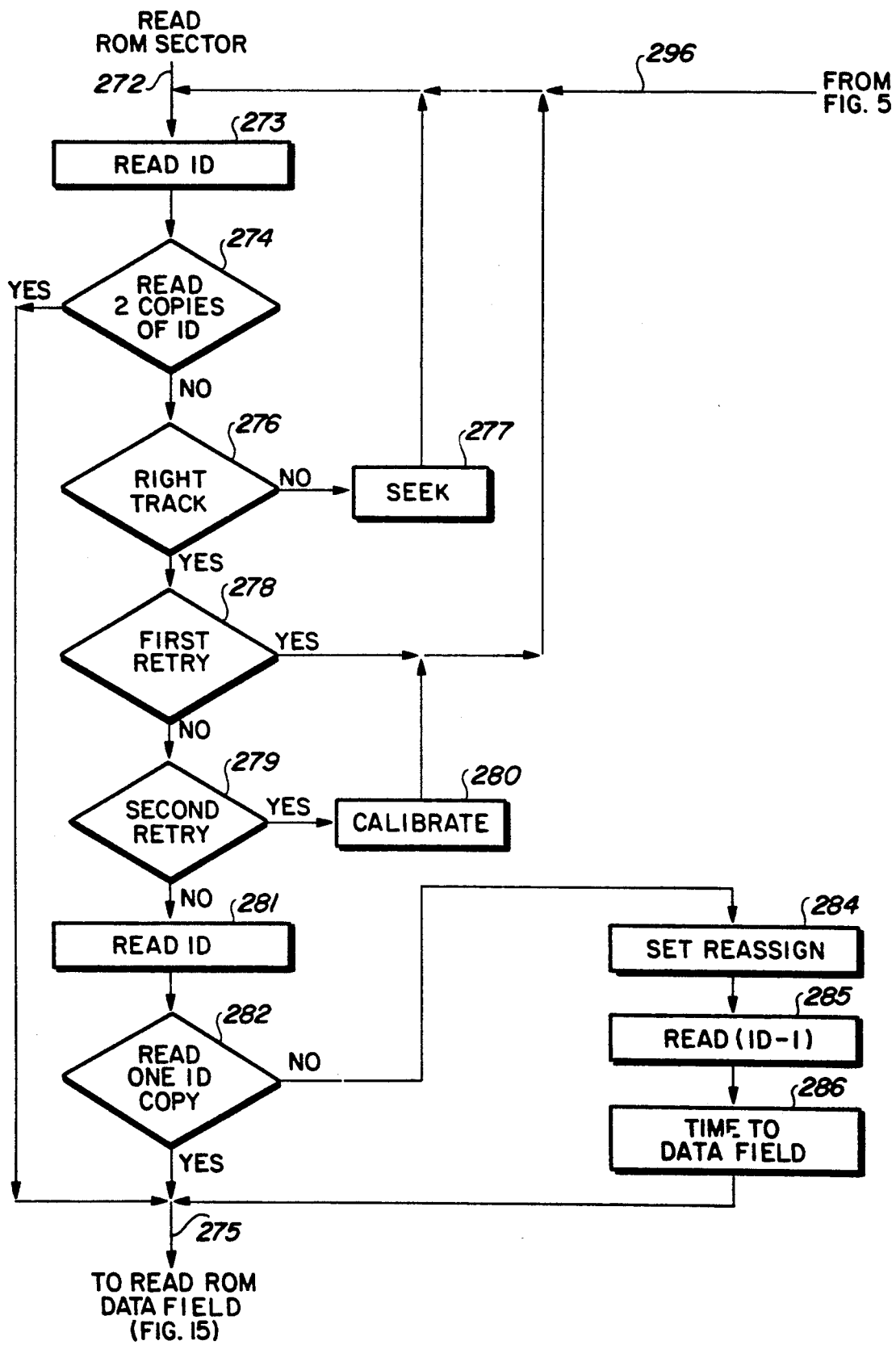
FIG. 14 is a simplified flow chart of reading a ROM sector ID portion and applying the present invention to such reading.
Figure 15:
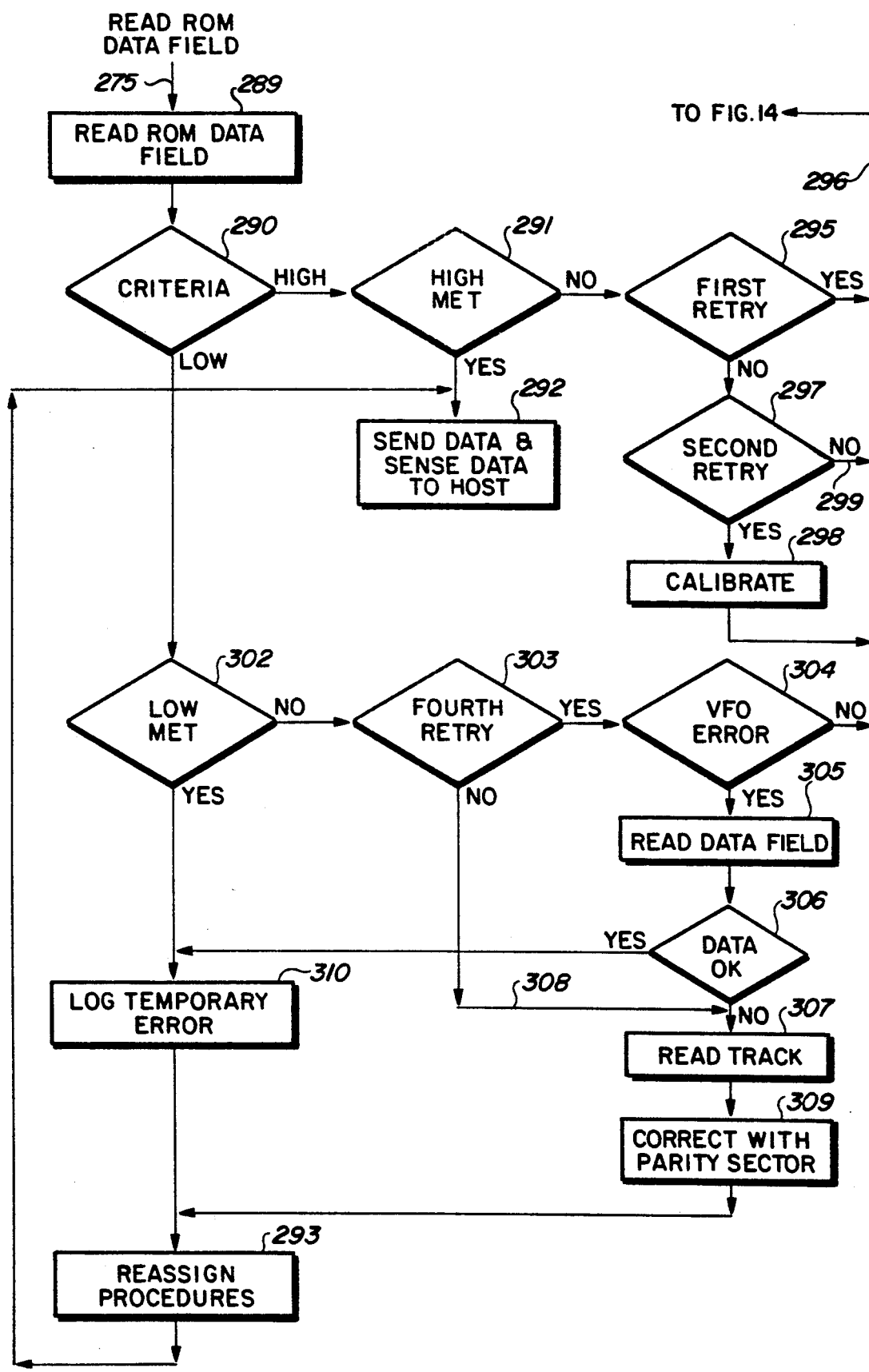
FIG. 15 is a simplified flow chart of reading a ROM data field and applying the teachings to the present invention to such reading operation.

FIGS. 14-16 show operations with respect to the ROM tracks in ROM area 102. At line 272 reading a single ROM sector is initiated after seeking and circumferentially or rotationally positioning the beam on path 47 to the desired or addressed sector has been completed. It is to be remembered that the format of the signals in each ROM sector is identical to that in the MO sector, as shown in FIG. 5. Therefore, the machine operations are substantially identical except for the sensing of the ROM signals uses light intensities variation sensing while the MO requires the sensing shown in FIG. 3. Combining the two sensing operations is known, and not described for that reason.

The first step, for the currently accessed ROM sector, is to read the sector ID at step 273. At step 274 it is whether or not two of the copies 118-120 of the sector ID have been successfully read. Upon successfully reading two of the sector ID copies, machine operations proceed along path 275 to the read ROM data machine operations shown in FIG. 15. On the other hand, if two copies of the sector ID were not successfully read, then at machine step 276 it is determined whether or not the beam along path 47 is scanning the correct or right track. This action is achieved by reading sector ID along the track being scanned. If the beam is not accessing the correct track, a seek at step 277 is ordered for effecting the seek retries described for the ERP 12 of FIG. 1. Steps 273 and 274 are then repeated. Assuming that at step 276 the beam on path 47 is scanning the correct track, then at step 278 it is determined whether or not a first read ID retry is occurring. If yes, then a retry count in RAM 42 is incremented from zero to one. Upon the first retry, the sector ID copies are attempted to be read on the next rotation of disk 30 using the same high criteria. If the first retry had already been completed, then at machine step 279, it is determined whether or not it is the second retry. If the retry count is equal to unity, then this action is the second retry causing a calibrate operation at step 280 of the focus and tracking circuits 54. Following the calibration, step 273 is repeated again. If such reading of two of the sector ID copies 118-120 is not again successful, then the second retry was unsuccessful resulting in a third retry which causes the read sector ID step 281 to be performed at low criteria, i.e., successfully read one of the three copies 188-120 of the sector ID 119. This successful read is checked at step 282. If one sector ID copy has been successfully read, then machine operations proceed over path 275 to read the data field 131 of the current ROM sector. If none of the sector ID copies were successfully read, then at step 284 the reassign flag in RAM 42 is set. For a disk 30 having all ROM sectors, no reassignment can be used. Upon the next rotation of disk 30, the sector ID copies of the immediately up stream sector (ID-1) is read at step 285. The procedure for reading sector ID-1 is the same as described for steps 273 et seq. Upon a successful read of the copies of the sector ID-1 at step 286 a time out is set to time the scanning of the path 47 beam to the data field of the just addressed sector. Upon the time out elapsing, the ROM data field 131 is read as next described with respect to the machine operation shown in FIG. 15.

Reading the ROM data field begins at machine step 289 (FIG. 15) which senses the ROM data field 131 recorded data. At machine step 290, it is determined whether or not the criteria for reading is high or low. If it is high i.e., such as the first read, then machine 291 checks whether or not the high criteria were met. If yes, the usual case, then at machine step 292 the just-read data are sent to host processor 37 along with sense information. If high criteria were not met at step 291, then at machine step 295, a machine operation determines whether or not the last read is a first retry. If it is a first retry, then the machine operations shown in FIG.

14 are reentered over path 296. On the other hand, if the last read is not the first retry, i.e., a retry count of unity or more is in RAM 42, then at machine step 297, whether or not it is the second retry is determined. Such second retry is indicated by the retry count equaling one in RAM 42. If it is a second retry, then focus and tracking circuits 54 are calibrated at machine step 298. Then the operations proceed over path 296 to FIG. 14 for rereading the current ROM sector. On the other hand, if the second retry is unsuccessful from the step 297 machine operations proceed over path 299 which joins path 296 to cause a second read attempt after the step 298 calibration. At this point, after the first retry at high criteria, as represented by numeral 24 in FIG. 2, the criteria is switched from high to low criteria and that fact is noted in RAM 42 for the instant data field of the ROM sector. After reading the data field 131 at step 289, at step 290 whether the read met low or high criteria is determined. At step 302, whether or not the low criteria is met is determined. If the low criteria are not met, then at machine step 303 it is determined whether or not the last record attempt is the fourth retry i.e., the previous retry initiated by machine operations following path 299 was the third retry. If the current retry is a fourth retry, then at step 304 it is determined whether or not a VFO (variable frequency oscillator) error of the clocking system (not shown) of data circuits 75 is causing the error. If not, a fourth retry is performed by returning to the machine operations of FIG. 14 via path 296. If there is no detected VFO error at machine step 304, then at step 305 the sector including the sector ID portion 125 is attempted to be read without the benefit of the data circuits 75 being timed by the VF03 field 127 signals. If at step 306, the data is read correct (data ok), then a temporary error is logged at step 310 for inclusion in sense information for host processor 37. Reassignment procedures are then achieved at step 293. It should be noted that at step 306 if the data are correct then such data are forwarded to the host processor 37. The data OK means that error detection and correction circuits were able to detect and correct all of the errors in the data readback from disk 30. If the data are not OK, then at step 307 the entire track is read such that the entire set of sectors shown in FIG. 9 are read into host processor 37, for example. That is, each of the ROM sectors is a member of a parity set. The information in sectors S0 to SN-1 can be used to recreate the parity signals in SP 164 (these signals were recorded in disk 30 when it was manufactured). Upon completing reading the track or the set of parity sectors in which the instant ROM sector is a member, at machine step 309 the parity correction procedure is followed. Such parity correction uses known parity techniques. Following the parity correction, reassignment procedures at step 293 are instituted. If at step 302 the low criteria were met, then the data are forwarded to the host processor 37 and the temporary error is reported at steps 310.

FIG. 16 is an abbreviated flow chart of the error correction provided for the ROM sectors in the ROM area 102. At step 314, the FIG. 11 read procedure is used for reading the ROM sector. Whenever one of the ROM sectors is unreadable, all of the sectors in the parity set of such ROM sectors are read at machine step 315. Then parity correction is effected at step 316 in host processor 37. At step 317, the unreadable or bad sector data as recreated through the parity correction step 316. The recreated data is then recorded in the spare tracks 111 of MO area 101 as a reassignment of such data from a ROM sector to a writeable sector.

Figure 17:
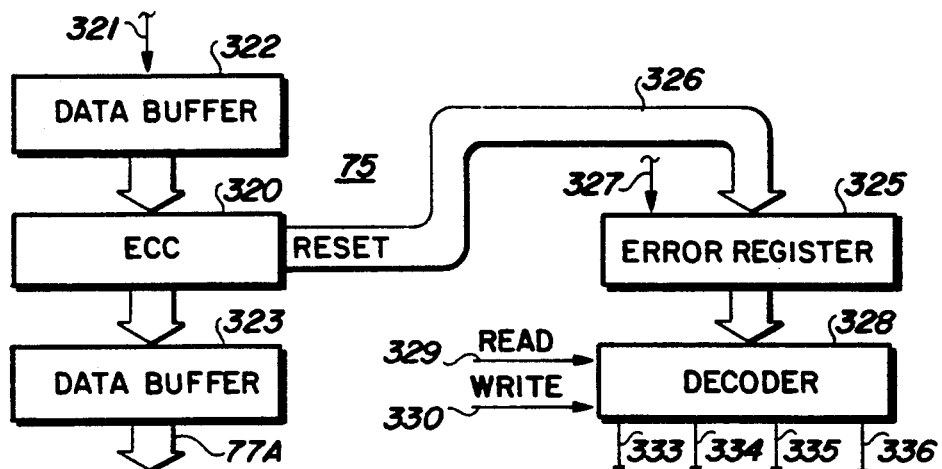
FIG. 17 diagrammatically illustrates an ECC data error detection and correction system usable in the FIG. 3 illustrated optical device.

FIG. 17 shows an implementation of the ECC error level monitor 13 of FIG. 1 and is similar to the operations set forth in Devore et al., supra. The ECC circuits 320 are constructed in the usual manner. Data read from the disk 30 is supplied to data circuits 75 which include the ECC circuits 320. An input data buffer 322 receives data serially byte by byte from a detector (not shown) in data circuits 75 over line 321. Such data detector is the usual data detector in an optical disk recorder. An output data buffer 323 stores the corrected data which are then supplied over cable 77 to attaching circuits 38 for transmission to host processor 37. The number of errors detected and their respective locations are supplied over cable 326 from ECC circuits 320 to error register 325. At the beginning of the read of each sector, a reset signal supplied over line 327 from microprocessor 40 resets the error register 325. Decoder 328 responds to the error signals stored in error register 325 and is actuated by a signal either over line 329 or 330 from microprocessor 40 at the end of each read or write verify operation i.e., after reading the data field 131. Decoder 328 uses the criteria set forth in Table I to construct signals indicating the status of error detection and correction. A signal on line 333 indicates that the high criteria are met. A signal on line 344 indicates that low criteria are met. A signal on line 335 indicates an uncorrectable error while a signal on line 336 verifies that the other signals are respectively for read or write verify operation. Microprocessor 40 responds to these signals for controlling machine operations set forth in the other figures. It is also understood that the decoder 328 may be program implemented.

It is to be appreciated that the various criteria and machine operations for effecting error control in an optical disk recorder can be varied as can be ascertained from reading this specification. The high and low criteria are best empirically determined for each class of optical disk magnetooptic media or ROM optical media. The characteristics of error detection and correction codes as well as the reliability of the focus and tracking circuits 34 and their respective precision in performing the focus and tracking functions is a factor to be ascertained in the error recovery procedures and in establishing high and low criteria. It is to be appreciated that each retry and each reassignment require an additional rotation of the optical disk 30. This delay in time can have a negative impact upon the performance of the system; however, it is more important to have high data integrity and system integrity then to have high performance without such integrity.

FIG. 18 illustrates data recovery from a verify command execution by the FIG. 3 illustrated device indicating a no-verify (the verify command execution indicated that the Table I listed high criteria were not met). Entry of machine operations into the FIG. 18 illustrated machine operations is from step 201 of FIG. 10. At machine step 400 the FIG. 3 illustrated device reports the detected no-verify to host processor 37. At machine step 401, executed in host processor 37, host processor 37 sends a read command to the FIG. 3 illustrated device for reading the data stored in the disk 30 sector 100 storing the non-verified recorded data. Since the read command criteria for a successful read are lower than the verify command criteria, the data stored in the non-verified sector 100 may still be successfully recovered. The FIG. 11 illustrated machine operations are performed by the FIG. 3 illustrated device. At machine step 402, executed the illustrated device. The device determines whether the data in the non-verified sector was successfully read. If the read command execution fails to read the data, then at machine step 403, host processor 37, possibly with manual intervention, performs other error recovery procedures beyond the present description. If the read command execution successfully read the data, then if the FIG. 3 illustrated device effected reassignment of the data to another sector in machine steps 330-332 of FIG. 11, then no further action by host processor 37 is required. The sense information supplied to host processor 37 or a result of executing a read command in step 401 enables host processor 37 to ascertain the use for steps 405-407. It may be that the step 401 executed read command was achieved meeting high criteria (read detection is not stressed detection as used for verify) or that the FIG. 3 illustrated device does not perform steps 330-332, then data reassignment is only performed by intervention of host processor 37. For a host processor 37 command reassignment, at machine step 405, host processor 37 issues a known reassign command to the FIG. 3 illustrated device whereupon at machine steps 406 and 407 the data is reassigned and recorded in a new sector.

In practicing the present invention, the machine operations illustrated in the present application can be varied and performed in part by host processor 37 or by the FIG. 3 illustrated device; the split of operations between host processor 37 and any attached device of such host processor is a matter of design choice. A controller may be interposed between the host processor 37 and the FIG. 3 illustrated device with the illustrated machine operations being divided amongst the host processor, controller and device.

While the invention has been particularly shown and described with reference to preferred embodiments thereof, it will be understood by those skilled in the art that various changes in form and details may be made therein without departing from the spirit and scope of the invention:

What is claimed is:

1. In a machine-effected method of operating an optical disk device having an optical storage member having a multiplicity of data storage locations, including the machine-executed steps of:

establishing and indicating acceptability criteria for sensing recorded data contained in any one of a plurality of addressable data storage locations on said optical storage member wherein sensing that exceeds said acceptability criteria produces a correct replica of the recorded data, said correct replica of the recorded data including up to a first number of corrected data errors, establishing said first number of corrected data errors as a high threshold of said acceptability criteria;

optically sensing data recorded in a first one of said addressable data storage locations for generating sensed data;

error detecting and correcting the sensed data to produce corrected data, examining the corrected data for being a correct replica of the recorded data, if said corrected data are not a correct replica of the recorded data, then rejecting the corrected data and indicating that said first one of the addressable data storage locations is a defective sector, if said corrected data are a correct replica of the recorded data, then examining the sensed data for determining a number of corrected data errors as a second number of corrected data errors;

comparing the first and second numbers for determining if one number is equal to or greater than another of said numbers, if said number is not less than said second number, then indicating that the acceptability criteria are met, if said second number is greater than said first number, then indicating that said acceptability criteria are not met; and responding to said indication that the acceptability criteria are not met for recording the corrected data read from said first one of said addressable data storage locations in a second data storage location on said storage member.

2. In the machine-effected method set forth in claim 1 wherein the optical disk device has focussing optics, further including the machine-executed steps of: after indicating that the acceptability criteria are not met, calibrating the focus of said focussing optics, then again sensing the data recorded in said first data storage location and repeating said optically sensing, error detecting and correcting and comparing steps.

3. In the machine-effected method set forth in claim 2 wherein the optical disk device has a track following system for guiding the focussing optics to follow a track on the storage member, further including the machine-executed steps of:

responding to said comparing step indicating that said acceptability criteria are not met to calibrate said track following system to improve the operation of the track following system to more closely guide the focussing optics to follow said track on the storage member.

4. In the machine-effected method set forth in claim 2 further including the machine-executed steps of:

when recording said corrected data at the second data storage location, marking the first data storage location as unsuitable for data storage;

if the recording in the second data storage location is unsuccessful, repeating selecting different data storage locations for recording said corrected data until the corrected data are successfully recorded in a one of the different data storage locations; and limiting the number of the repetitions of selecting different data storage locations to a predetermined number, if the number of repetitions equals said predetermined number, indicating a device error, responding to the indicated device error for stopping attempting to record the corrected data on the optical storage member.

5. In the machine-effected method set forth in claim 2 further including the machine-executed steps of:

establishing a low threshold of acceptability criteria for sensed data;

after said focus calibration, second resensing the recorded data in the first data storage location using said high threshold;

if the second resensing the recorded data is unsuccessful, then third resensing the recorded data using said low threshold, if the third resensing is successful, repeating said error detecting and correcting step for producing third corrected data, repeating said comparing step, if said repeated comparing step indicates that said third resensed data meets said low threshold, using the the third corrected data for data processing operations and recording the third corrected data in said second data storage location.

6. In the machine-effected method set forth in claim 5 further including the machine-executed steps of:
   after said calibrating step, executing said second resensing step.

7. In the machine-effected method set forth in claim 2 further including the machine-executed steps of:
   providing said optical storage member with read only (RO) and writeable (RW) portions, each portion having a plurality of the addressable data storage locations;
   in said optically sensing step, sensing data recorded in either of said portions; and
   in said responding step, before recording the corrected data, selecting one of the addressable data storage locations in said RW portion as the second data location.

8. In the machine-effected method set forth in claim 7 further including the machine-executed steps of:
   selecting first high threshold criteria for said RW portion and second high threshold criteria for said RO portion; and
   making the first high threshold criteria to require a higher quality of sensed data than the second high threshold criteria.

9. In the machine-effected method set forth in claim 7 further including the machine-executed steps of:
   selecting the first data storage location to be in the RO portion; and
   recording the corrected data in the second data storage location in the RW portion.

10. In the machine-effected method set forth in claim 1 further including the machine-executed steps of:
    selecting a format in the storage member to consist of a multiplicity of addressable sectors, selecting each sector to be a respective one of the addressable data storage locations and to have a sector ID area and a data storing area, each of said sector ID areas in the respective addressable data storage locations containing an unique sector ID; and
    establishing said high acceptability criteria for each sector ID area and the data storing area for accepting a lower quality of sensed data for the sector ID area than that established for the data storing area.

11. In the machine-effected method set forth in claim 10 further including the machine-executed steps of:
    establishing low acceptability criteria for each of said sector ID's and data storing areas, said low acceptability criteria having criteria for accepting said sensed data even though quality of said sensed data do not meet said high threshold;
    in said sensing step, sensing data recorded in the sector ID area using said low acceptability criteria and sensing the recorded data in the data area using said high acceptability criteria.

12. In the machine-effected method set forth in claim 11 further including the machine-executed steps of:
    determining that sensing said sector ID contained in the sector ID area of said second data storage location produces sensed data that do not meet said low acceptability criteria; and
    responding to said determining the sensed data read from the sector ID area of said second data storage location does not meet said low acceptability criteria of recording said corrected data sensed from the data area in the second data storage location into a third one of said data storage locations and marking said second data storage location as being defective.

13. In the machine-effected method set forth in claim 10 wherein the device has focussing optics, further including the machine-executed steps of:
    after said detecting step, calibrating the focussing optics after sensing recorded data in either said sector ID or said data area which sensed data measured acceptability criteria does not meet said established threshold used in the sensing of such recorded data, respectively.

14. In the machine-effected method set forth in claim 10 further including the machine-executed steps of:
    establishing separate high acceptability criteria for said sector ID for recording data in a sector, for erasing data from a sector and for sensing recorded data from a sector; and
    establishing separate low acceptability criteria for said sector ID for recording data in a sector, for erasing data from a sector and for sensing recorded data from a sector, performing said recording in the second data storage location only when the measured acceptability criteria meet and do not exceed said low acceptability criteria.

15. In the machine-effected method set forth in claim 14 further including the machine-executed steps of:
    recording said corrected data in the second data storage location produced from sensed data read from said first data storage location data area if either of said established low acceptability criteria are met and said high threshold is not met for said sensed data read from said data area.

16. In the machine-effected method set forth in claim 1, further including the machine-executed steps of:
    whenever said comparing step indicates that the high threshold is met, supplying the sensed data to a host for data processing operations; and
    whenever said comparing step indicates that the high threshold is not met, then supplying the sensed data to the host for said data processing operations only after successfully recording the corrected data at the second data storage location.

17. In a machine-effected method of operating an optical disk device having an optical storage medium with a multiplicity of addressable data storage locations, including the machine-executed steps of:
    establishing high and low criteria for data exchanging operations of the optical device with the optical storage medium;
    in a first data exchanging operation, recording data at a first data storage location on the storage medium and verifying that such data are successfully recorded in the first data storage location which meets predetermined ones of said high criteria for recording data on the storage medium;
    detecting that a predetermined data exchanging operation which senses data recorded in said first data storage location by said first data exchanging operation and occurring after said first data exchanging operation meets said low criteria but not said high criteria; and
    recording the data sensed from the first data storage location at a second data storage location.

18. In the machine-effected method set forth in claim 17 further including the machine-executed steps of:
    dividing said first data exchanging operation into first and second portions;
    in said first portion of said first data exchanging operation making the low criteria equal to the high criteria and in said second portion maintaining said high acceptability criteria and low acceptability criteria without any changes;

recording given data in said second portion of said first data storage location, then, sensing the recording data in the first data storage location immediately after recording same, and if the sensed just-recorded data does not meet said high criteria, recording the data to be recorded in the first data storage location at a third data storage location and using said third data storage location thereafter in place of said first data storage location.

19. In the machine-effected method set forth in claim 18 further including the machine-executed steps of:

providing error detector and correction (ECC) having a capability of detecting and correcting K errors without external error pointers, wherein K is a positive integer;

recording an ECC redundancy as a part of the data being recorded and ECC detecting and correcting said sensed data using the provided ECC;

while recording data making the high criteria to include an error rate of M of K errors in the immediately sensed data of M corrected errors wherein M is a positive integer less than half of K;

while sensing recorded data making the high criteria to include said M of K error rate and making said low criteria to include N of K error rate wherein N is a positive integer greater than M and not greater than K; and determining that said predetermined data exchanging operation has an error rate of N of K errors, responding to said determined error rate of N of K errors for recording the sensed recorded data from said predetermined data exchanging operation into a second data storage location.

20. In the machine-effected method set forth in claim 17 further including the machine-executed steps of:

selecting a format in the storage member to consist of a multiplicity of addressable sectors, selecting each sector to be a data storage location and to have a sector ID area and a data storing area; and establishing said high acceptability criteria for each sector ID area and the data area so as to require a higher quality of sensed data for the sector ID area than that established for the data area.

21. In the machine-effected method set forth in claim 18 further including the machine-executed steps of:

providing said storage medium with read only (RO) and writeable (RW) portions, each portion having a plurality of said sectors;

selecting a format in the storage member in both of said RO and RW portions to consist of a multiplicity of addressable sectors, selecting each sector to be a data storage location and to have a sector ID area and a data storing area; and establishing said high acceptability criteria for each sector ID area and the data area for accepting a lower quality of sensed data for the sector ID area than that established for the data area; and always selecting the second data location to be a sector in said RW portion.

22. In the machine-effected method set forth in claim 21 further including the machine-executed steps of:

positioning the RW portion radially inward of the RO portion and in immediate radially abutting juxtaposition and to the RO portion.

23. In the machine-effected method set forth in claim 22 further including the machine-executed steps of:

dividing the RW and the RO portions into radial zones, each said radial zone having a predetermined segment of said RW portion;

predetermined ones of said zones each including a segment of said RO portion; and in each said predetermined ones of said zones, establishing two bands of sectors, denominating a first band in each said predetermined ones of said zones to primarily store data, selecting said first data storage location from said first band, selecting said second data storage location from said second band, placing all of said second bands in said respective segments of said RW portion in aid predetermined ones of said zones.

24. In the machine-effected method set forth in claim 21 further including the machine-executed steps of:

establishing, in said RO portion, a plurality of parity sets of sectors, each set including a given number of data storing sectors and a parity sector, the data recorded in the parity sector being a parity error detecting residue of the signals in the data storing sectors in the respective parity sets; and using said parity sector to correct data sensed from any of said data storing sectors in the same purity set and then recording the corrected data in the second data storage location in the RW portion.

25. In the machine-effected method set forth in claim 17 wherein said optical device includes focussing optics, further including the machine-executed steps of:

selecting a format in the storage member to consist of a multiplicity of addressable sectors, selecting each sector to be a respective one of the addressable data storage locations and to have a sector ID area and a data storing area, each of said sector ID areas in the respective addressable data storage locations containing a unique sector ID;

calibrating the focussing optics after sensing recorded data in either said sector ID or said data storing area from which sensed data were produced that does not meet said high criteria; and then sensing recorded data contained in both the sector ID and said data area for the data recorded therein and accepting the sensed recorded data that meets said low criteria.

26. In the machine-effected method set forth in claim 25 further including the machine-executed steps of:

after said calibrating, sensing the sector ID and said data area using said high criteria; and if the high criteria are not met, then sensing the recorded data in said sector ID and said data area using said low criteria.

27. In the machine-effected method set forth in claim 25 further including the machine-executed steps of:

recording said corrected data produced from said sensed data read from the data area only if the low criteria are met.

28. In a machine-effected method of operating an optical disk device having an optical storage medium with a multiplicity of addressable data storage locations, including the machine-executed steps of:

establishing high and low criteria for a plurality of predetermined device operations of the optical disk device that involve said optical storage medium;

monitoring a given one of the predetermined operations and comparing the monitored given operation with the high criteria for such monitored operation;

if the comparison indicates the high criteria are met, proceeding with operating the optical device with no changes;

if the comparison indicates the high criteria are not met, retrying the monitored operation using a predetermined retry procedure, when the retry procedure results in a monitored operation meeting the low criteria, changing the operation of the optical device for subsequent repetitions of the monitored operation for enabling such subsequent repetitions to meet said high criteria.

29. In a machine-effected method of operating an optical recorder having an optical record member, control circuits including focussing circuits for focussing a beam of radiation onto the record member and tracking circuits for relatively positioning the beam and the record member for effecting exchanging signals between the recorder and the record member, including the machine-executed steps of:

performing a predetermined information-bearing signal transfer operation which includes exchanging signals between the recorder and the optical recorder member;

detecting a predetermined error in said signal transfer;

calibrating said control circuits for improving their operation;

repeating the predetermined information-bearing signal transfer for exchanging signals between the recorder and the optical record member; and after said detecting step and before said calibrating step, repeating the predetermined information-signal transfer operation for achieving a successful operation including repeating the transfer operation a first number of times, if unsuccessful and after said first number of unsuccessful repetitions, performing said calibrating step.

30. In the machine-effected method set forth in claim 29 further including the machine-executed steps of:

detecting that the first number of repeated signal transfers are unsuccessful, then, indicating a permanent error and aborting the signal transfer.

31. In the machine-effected method set forth in claim 29 further including the machine-executed steps of:

detecting that the repeated signal transfers are unsuccessful, then reassigning the information-bearing signals to another area of the record member and recording the reassigned information-bearing signals in said another area.

32. In a machine-effected method of operating an optical device that operates with an optical record member and has circuit optical means for causing a light beam to impinge on the optical record member for effecting signal transfers between the optical device and the optical record member including the machine-executed steps of:

attempting an exchange of signals between the record member and the optical device;

detecting that the exchange of signals was unsuccessful;

calibrating the circuit-optical means to improve the light beam impingement on the record member;

retrying the attempted exchange of signals, and if unsuccessful, reassigning the signals to another portion of the record member and recording the reassigned signals in said another portion.

33. In an optical recorder having an optical record member, control circuits including focussing circuits for focussing a beam of radiation onto the record member and tracking circuits for relatively positioning the beam and the record member for effecting exchanging signals between the recorder and the recorder member, including in combination;

signal transfer means for performing a predetermined information-bearing signal transfer operation which includes exchanging signals between the recorder and the optical record member;

error means connected to the signal transfer means for detecting a predetermined error in said signal transfer and including error correction means for correcting said predetermined error for producing a first copy of corrected data, quality means indicating predetermined quality acceptance criteria, indicating means in the error means connected to the quality means and to said signal transfer means for indicating that predetermined quality acceptance criteria are not met in said signal transfer;

calibration means in said control circuits connected to the error means and being responsive to said indication that the signal transfer did not meet said predetermined quality acceptance criteria for calibrating said control circuits for improving their operation;

control means in said signal transfer means and being connected to the calibration means for being responsive to said calibration of said control circuits for actuating the signal transfer means to repeat the predetermined information-bearing signal transfer for exchanging signals between the recorder and the optical record member for producing a second copy of said corrected data; and said indicating means in said error means for detecting and indicating that the repeated signal transfer also does not meet said predetermined quality acceptance criteria, said control means being responsive to said indicating means indicating that the repeated signal transfer does not meet said predetermined quality acceptance criteria for reassigning the corrected data to another area of the record member and to activate said signal transfer means for recording the corrected data into said another area.

34. In the recorder set forth in claim 33 further including, in combination;

retry means in said control means responsive to said error means for repeating, up to a first number of repetitions, the predetermined information-signal transfer operation for attempting to achieve an information-signal transfer operation that meets said predetermined quality acceptance criteria; and said calibration means being responsive to the retry means and said error means for performing said calibration step only after said first number of repeated information-signal transfers.

35. In the recorder set forth in claim 34 further including, in combination:

means in said control means for detecting that none of the repeated information-bearing signal transfers meet said predetermined quality acceptance criteria for actuating the signal transfer means indicating a permanent error.

36. In an optical device that operates with an optical record member and has optical means for causing a light beam to impinge on the optical record member for effecting signal transfers between the optical device and the optical record member; including, in combination, the machine executed steps of:

signal transfers means for attempting an exchange of signals between the record member and the optical device;

error means having criteria means for indicating quality criteria for signal exchanging and for detecting whether or not the exchange of signals met the quality criteria;

calibrating means responsive to the error means indicating the signal exchange did not meet the quality criteria for calibrating the circuit-optical means to improve the light beam impingement on the record member; and retry means responsive to the calibrating means and to the error means to activate the signal transfer means for retrying the attempted exchange of signals, and if unsuccessful, reassigning the signals to another portion of the record member and activating the signal transfer means for recording the reassigned signals in said another portion.

37. In an optical disk device having an optical storage member with a multiplicity of addressable data storage locations, including, in combination:

means for establishing and indicating acceptability criteria for sensing recorded data contained in any one of a plurality of addressable data storage locations on said optical storage member wherein said sensing produces a correct replica of the recorded data that includes a first number of corrected data errors, establishing said first number of corrected data errors as a high threshold of said acceptability criteria;

signal transfer means for optically sensing data recorded in a first storage location on the storage member and including error detecting and correcting means for correcting sensed data to corrected data;

quality means connected to said establishing means and to said signal transfer means for determining and indicating that said optical sensing meets said high threshold; and reassignment means connected to said quality means for responding to said indication that the high threshold was not met in said optical sensing of data for activating the signal transfer means for recording the corrected data at a second data storage location on said storage member.

38. In the optical disk device set forth in claim 37 wherein the optical disk device has focussing optics, further including, in combination:

calibration means responsive to the comparing means detecting that the measured acceptability does not meet the high threshold for calibrating the focus of said focussing optics and for activating the signal transfer means for again sensing the data recorded in said first data storage location; and said reassignment means being connected to said comparing means for being responsive to said quality means for reassigning said corrected data only after said calibration means has calibrated said focusing circuits.

39. In the optical disk device set forth in claim 37 wherein the signal transfer means has a track following system for enabling the optical disk device to address one of said data storage locations and for seeking to said addressed one of said data storage locations, further including, in combination:

calibration means responsive to the comparing means for calibrating said track following system and said detecting means not reassigning the said data to the record data storage location until after the calibration means has calibrated the track following system.

40. In the optical disk device set forth in claim 37 further including the machine-executed steps of:

said storage medium having read only (RO) and writeable (RW) portions, each portion having a plurality of data storage locations; and said detecting means being operative with both said portions and always selecting the second data location to be in said RW portion.

41. In an optical disk device having an optical storage medium with a multiplicity of addressable data storage locations, signal transfer means for effecting signal exchanging between said optical storage medium and said optical disk device including, in combination:

threshold means for establishing high and low criteria for data exchanging operations of the optical device with the optical storage medium;

said signal transfer means in a first data exchanging operation, recording data at a first data storage location on the storage medium and verifying that such data are successfully recorded in the first data storage location which meets predetermined ones of said high criteria for recording data on the storage medium;

error means for detecting that a predetermined data exchanging operation which senses data recorded in said first data storage location in said first data exchanging operation and occurring after said first data exchanging operation meets said low criteria but not said high criteria; and control means responsive to the error means for activating the signal transfer means for recording the data sensed from the first data storage location at a second data storage location.

42. In the optical disk device set forth in claim 41 further including, in combination:

said signal transferring means dividing said first data exchanging operation into first and second portions;

said threshold means in said first portions of said first data exchanging operation making the low criteria equal to the high criteria;

said signal transfer means sensing the recorded data in the first data storage location immediately after recording said recorded data as just-recorded data, said error means for determining if the just-recorded data does not meet said high criteria, then responding to said determination that the just-recorded data do not meet said high criteria for activating the signal transfer means for recording the data to be recorded in the first data storage location at a third data storage location.

* * * * *

UNITED STATES PATENT AND TRADEMARK OFFICE
CERTIFICATE OF CORRECTION

PATENT NO. : 5,233,584

DATED : August 3, 1993

INVENTOR(S) : John E. Kulakowski, et al.

It is certified that error appears in the above-identified patent and that said Letters Patent is hereby corrected as shown below:

At column 26, line 5, after the second occurrence of said, insert --first--.

At column 29, line 14, the word "detector" should be --detection--.

At column 29, line 66, delete the word "and".

At column 30, line 13, the word "aid" should be --said--.

At column 32, line 4, the word "recorder" should be --record--.

Signed and Sealed this

Twenty-sixth Day of April, 1994

Attest:

BRUCE LEHMAN

Attesting Officer     Commissioner of Patents and Trademarks